(12) United States Patent
Tsui et al.

(10) Patent No.: US 6,385,237 B1
(45) Date of Patent: May 7, 2002

(54) NON-INVASIVE DIGITAL CABLE TEST SYSTEM

(75) Inventors: Ernest T. Tsui, Cupertino; Jeffrey Marc Kletsky, San Francisco, both of CA (US)

(73) Assignee: Wavetek Wandell and Goltermann, Indianapolis, IN (US)

( * ) Notice: Subject to any disclaimer, the term of this patent is extended or adjusted under 35 U.S.C. 154(b) by 0 days.

(21) Appl. No.: 09/496,232

(22) Filed: Feb. 1, 2000

Related U.S. Application Data

(60) Division of application No. 08/791,386, filed on Jan. 30, 1997, now Pat. No. 6,061,393, which is a continuation-in-part of application No. 08/532,017, filed on Sep. 21, 1995, now Pat. No. 5,751,766, which is a continuation-in-part of application No. 08/430,909, filed on Apr. 27, 1995, now abandoned.

(51) Int. Cl.⁷ ............................................. H04B 17/00
(52) U.S. Cl. ........................................ 375/228; 370/241
(58) Field of Search ......................... 375/224, 226–228, 375/322, 324; 348/192, 193; 370/241, 248, 252

(56) References Cited

U.S. PATENT DOCUMENTS

| | | |
|---|---|---|
| 4,384,354 A | 5/1983 | Crawford et al. |
| 4,408,227 A | 10/1983 | Bradley |
| 4,639,934 A | 1/1987 | Zuranski et al. |
| 4,985,900 A | 1/1991 | Rhind et al. |
| 5,144,642 A | 9/1992 | Weinberg et al. |
| 5,187,719 A * | 2/1993 | Birgenheier et al. ........ 375/224 |
| 5,233,628 A | 8/1993 | Rappaport et al. |
| 5,416,799 A | 5/1995 | Currivan et al. |
| 5,434,884 A | 7/1995 | Rushing et al. |
| 5,490,199 A | 2/1996 | Fuller et al. |
| 5,517,522 A | 5/1996 | Arweiler et al. |
| 5,533,067 A | 7/1996 | Jamal et al. |
| 5,724,388 A * | 3/1998 | Nagano et al. ............. 375/224 |

OTHER PUBLICATIONS

Applied Signal Technology, Inc., "User's Manual for PSK/QAM Demodulation and Channel Characterization Using the ZEST, ZRES, ZEQD, & CHID Modules," Feb. 1990, pp. 1 to pp. 53.

(List continued on next page.)

*Primary Examiner*—Amanda T. Le
(74) *Attorney, Agent, or Firm*—Maginot, Moore & Bowman

(57) ABSTRACT

Method and apparatus for non-invasive testing of digital communications systems. Amplitude measurements are made for multiple frequencies of a multi-frequency communication system, converted to the time domain. An adaptive filter output is matched to the time domain representation to characterize the channel. Impedance mismatches may be precisely located using this technique. An error signal representing a difference between a signal transmitted through the channel and a received signal is estimated and analyzed. The error signal is separated into components corresponding to contributions by wide band noise, residual phase modulation, and residual amplitude modulation. Identification and removal of narrow-band interferers may occur prior to this separation. Bit error rate and system margin computations employ a Monte Carlo simulation of the various error sources. This provides a well refined estimate of bit error rate and system margin.

21 Claims, 16 Drawing Sheets

OTHER PUBLICATIONS

Applied Signal Technology, Inc., Wideband PCM Channel Characterization Study Final Report (vol. 1), Revision 2, May 1988, pp. 1–4–32.

Helen Chen, "Testing Digital Video," Digital Measurements, Hewlett Packard Brochure 5964–1824E, pp. 1 to pp. 11, (most recent reference Dec. 1994).

Helen Chen, "Testing Digital Video—Part 2," Digital Measurements, Communication Technology, Jun. 1995, pp. 80 to pp. 98.

Gooch et al., "Blind Channel Identification Using the Constant Modulus Adaptive Algorithm," International Conference on Communications, Jun. 1988, pp. 1 to pp. 5.

Oppenheim A. V., et al., "Programs for Digital Signal Processing," Edited by the Digital Signal Processing Committee, IEEE Acoustics, Speech and Signal Processing Society, Chapter 7, Cepstral Analysis, 1979, pp. 7.0–1 to pp. 7.2–6.

Oppenheim A. V., et al., "Cepsrum Analysis and Homomorphic Deconvolution," Discrete–Time Signal Processing, Chapter 12, 1989, pp. 768 to pp. 815.

* cited by examiner

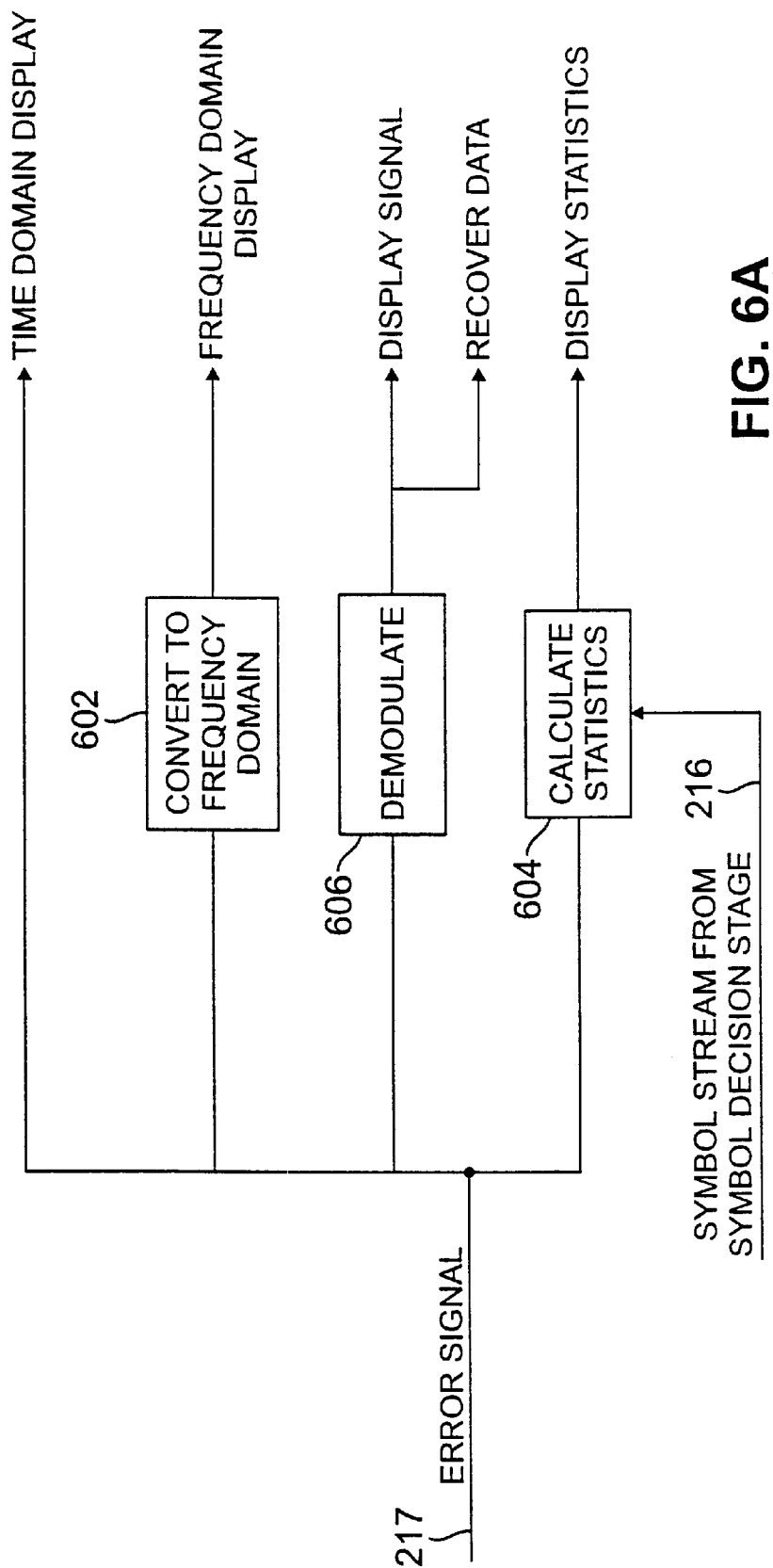

NON-INVASIVE DIGITAL CABLE TEST SYSTEM

STATEMENT OF RELATED APPLICATIONS

This application is a division of Ser. No. 08/791,386, filed Jan. 30, 1997, now U.S. Pat. No. 6,061,393, which is a continuation-in-part of U.S. patent application Ser. No. 08/532,017, filed Sep. 21, 1995, now U.S. Pat. No. 5,757, 766, which is in turn a continuation-in-part-of U.S. patent application Ser. No. 08/430,909, filed Apr. 27, 1995, now abandoned. The contents of both parent applications are herein incorporated by reference for all purposes.

BACKGROUND OF THE INVENTION

The present invention relates to measuring signal degradation in communications systems. In particular, the invention relates to methods and apparatus for non-invasively measuring performance of a digital broadcast system.

Digital communication technologies offer numerous advantages over their analog predecessors. Nearly error-free transmission is guaranteed if a threshold signal-to-noise ratio is available. Channel distortions may be corrected using adaptive equalizers. Coding techniques may be advantageously employed both to overcome channel-related signal impairments and to minimize usage of bandwidth.

Nonetheless, digital communication system operation is not fault-free. The transmission of information over a physical medium ultimately requires analog components such as RF mixers, amplifiers, oscillators, etc. that are prone to misalignment, temperature caused drift, and various other modes of failure. The physical medium itself also introduces impairments in the form of added noise and reflections. Digital receivers can inherently correct for errors up to a certain threshold, but if that threshold is exceeded, communication is severely impaired.

Digital communication techniques found their earliest application in the context of point-to-point links as would be used by the military or commercial common carriers. In these applications, the link may be tested by interrupting normal service and transmitting test signals. For example, if it is desired to test the link margin of a link, a test signal could be transmitted at progressively reduced power levels until the signal can no longer be accurately received.

Increasingly, digital techniques are being applied to broadcasting. One important example is broadcasting of digital video signals to numerous subscribers over coaxial cable, or over the air. Commercial digital broadcast systems require high reliability yet these digital broadcast systems cannot be tested as easily as the point-to-point links. Interrupting normal service for transmission and measurement of test signals is not a commercially viable option.

SUMMARY OF THE INVENTION

The present invention provides method and apparatus for non-invasive testing of digital communications test systems. In accordance with a first aspect of the invention, amplitude measurements are made for multiple frequencies of a multi-frequency communication system, and converted to the time domain. An adaptive filter then seeks to match its output to the time domain representation, thereby characterizing the channel. Impedance mismatches may be precisely located using this technique.

In accordance with a second aspect of the invention, an error signal representing a difference between a signal transmitted through the channel and a received signal is estimated and analyzed. The error signal is separated into components corresponding to contributions by wide band noise, residual phase modulation, and residual amplitude modulation. Identification and removal of narrow-band interferers may occur prior to this separation. Bit error rate and system margin computations employ a Monte Carlo simulation that simulates the various error sources. This provides a well refined estimate of bit error rate and system margin.

In accordance with a third aspect of the invention, a cluster variance measurement based on an error signal is used to estimate bit error rate. In accordance with a fourth aspect of the invention, an error signal is displayed in the frequency domain relative to a measured power of a received signal.

The invention will be better understood by reference to the following detailed description in connection with the accompanying drawings.

BRIEF DESCRIPTION OF THE DRAWINGS

FIG. 6A is a block diagram describing various modes of taking advantage of error signal 217 which represents ingress interference in communications channel 104.

DESCRIPTION OF SPECIFIC EMBODIMENTS
Digital Communications Background

Figure 1:
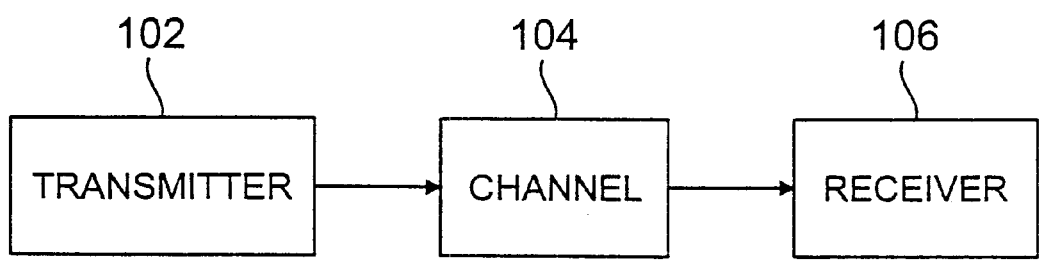
FIG. 1 depicts a simplified representation of a representative digital communication system suitable for testing in accordance with the present invention.

FIG. 1 depicts a simplified representation of a representative digital communication system 100 suitable for testing in accordance with the present invention. Digital communication system 100 includes a transmitter 102, a communications channel 104, and a digital receiver 106. Transmitter 102 receives digital data to be transmitted to receiver 106 and incorporates channel coding, modulation, up-conversion, amplification, and output filtering functions. The present invention is not restricted in application to any particular channel, code, digital modulation scheme, or frequency band. Channel 104 represents any physical medium for transferring a signal for transmitter 102 to receiver 106. For example, transmitter channel 104 may represent a coaxial cable delivery system and transmitter 102 may be a cable head-end. Alternatively, channel 104 may represent transmission between a satellite and a ground-based receiver. Furthermore, receiver 106 need not be uniquely coupled to channel 104. Channel 104 may represent a broadcast medium accessible to numerous receivers.

Figure 2A:
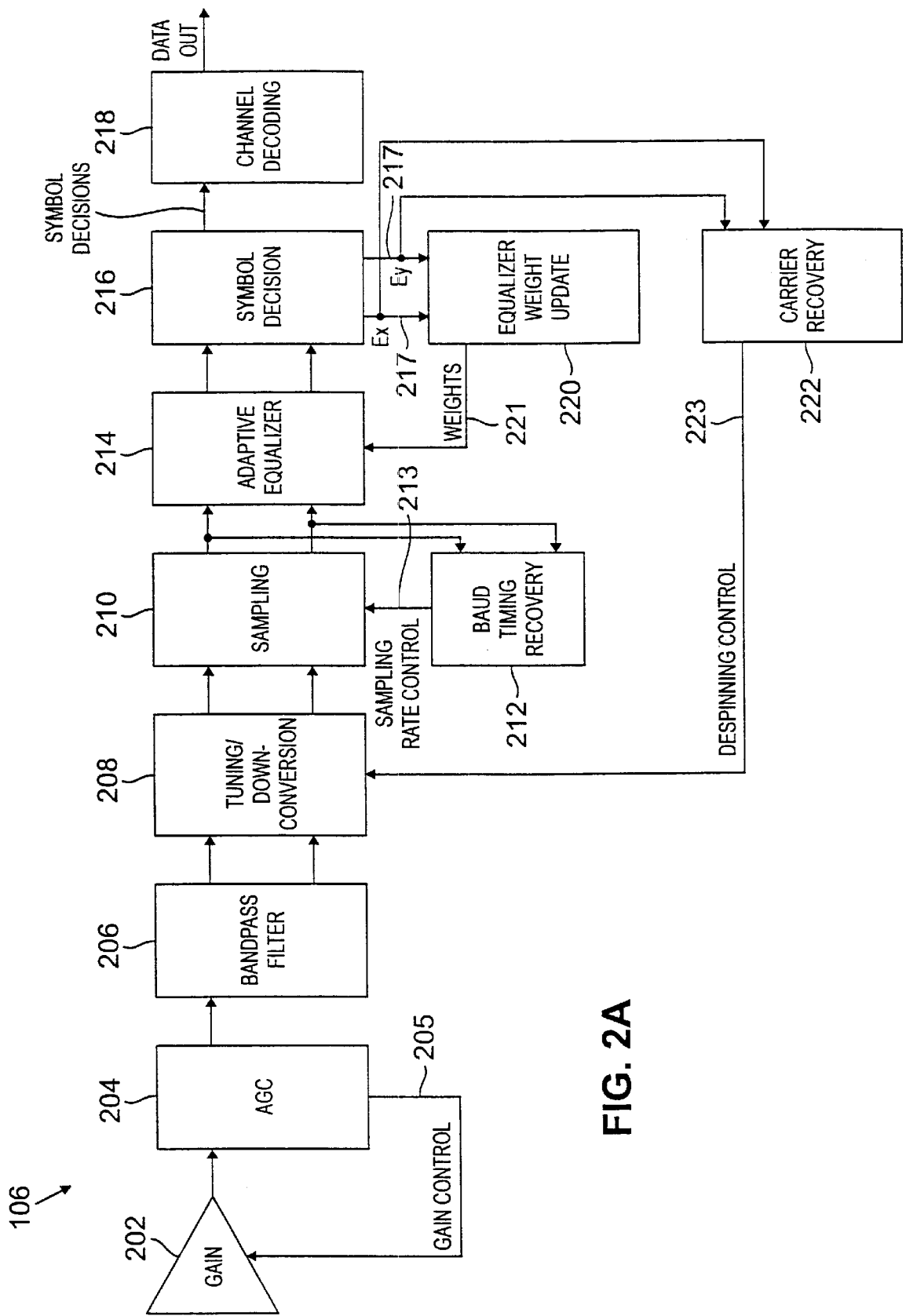
FIG. 2A is a block diagram depicting one implementation of a portion of a digital receiver.

The present invention takes advantage of various signals and data generated internally to digital receiver 106. FIG. 2A is a block diagram depicting one implementation of a portion of digital receiver 106. After filtering and downconversion, a signal received from channel 104 is passed through a variable gain stage 202. The amplified output of gain stage 202 passes through an AGC control circuit 204 which controls the gain of gain stage 202 using a gain control signal 205. A bandpass filter 206 selects a particular range of frequencies so as to guard against later development of unwanted image signals by a tuning/downconversion stage 208. Tuning/downconversion stage 208 selects a particular signal of interest and converts this signal to baseband. Typically, tuning/downconversion stage 208 incorporates at least one voltage controlled oscillator (VCO) which is at least partially controlled by a special control signal developed to minimize residual frequency modulation in the downconverted signal. For modulation schemes that involve two orthogonal components such as QPSK, QAM etc., tuning/downconversion stage 208 develops two outputs corresponding to each orthogonal component. The present invention is not limited to any particular modulation scheme.

Up until this stage, the signals are presumed to be analog and continuous. A sampling stage 210 converts the downconverted signal to a discrete-time digital representation. The sampling rate is synchronized to symbol boundaries within the received data stream by a baud timing recovery loop 212 that generates a sampling rate control signal 213.

An adaptive equalizer 214 automatically corrects for distortions in channel 104 and typically includes a digital FIR filter and/or IIR filter with variable tap weights. (Alternative receiver architectures employ equalizers with fixed tap weights or omit equalization entirely.) A symbol decision stage 216 examines the data output from adaptive equalizer 214 and estimates the transmitted data based on a maximum likelihood decision rule corresponding to the modulation scheme employed. A channel decoding stage 218 removes effects of forward error correction (FEC) or other channel coding schemes employed. Further stages (not shown) may remove source coding, differential coding, scrambling, interleaving, or compression applied to the transmitted data.

Symbol decision stage 216 also generates an error signal 217 corresponding to the difference between an ideal modulation signal representing the output estimates and input of symbol decision stage 216. This error signal is an input to a weight updating stage 220 that adjusts weights 221 of adaptive equalizer 214 to minimize certain components of the error. A carrier recovery stage 222 also makes use of this error signal to remove residual frequency offset and frequency modulation effects induced in part by tuning/downconversion stage 208 by controlling the internal VCO with a despinning control signal 223.

Figure 2B:
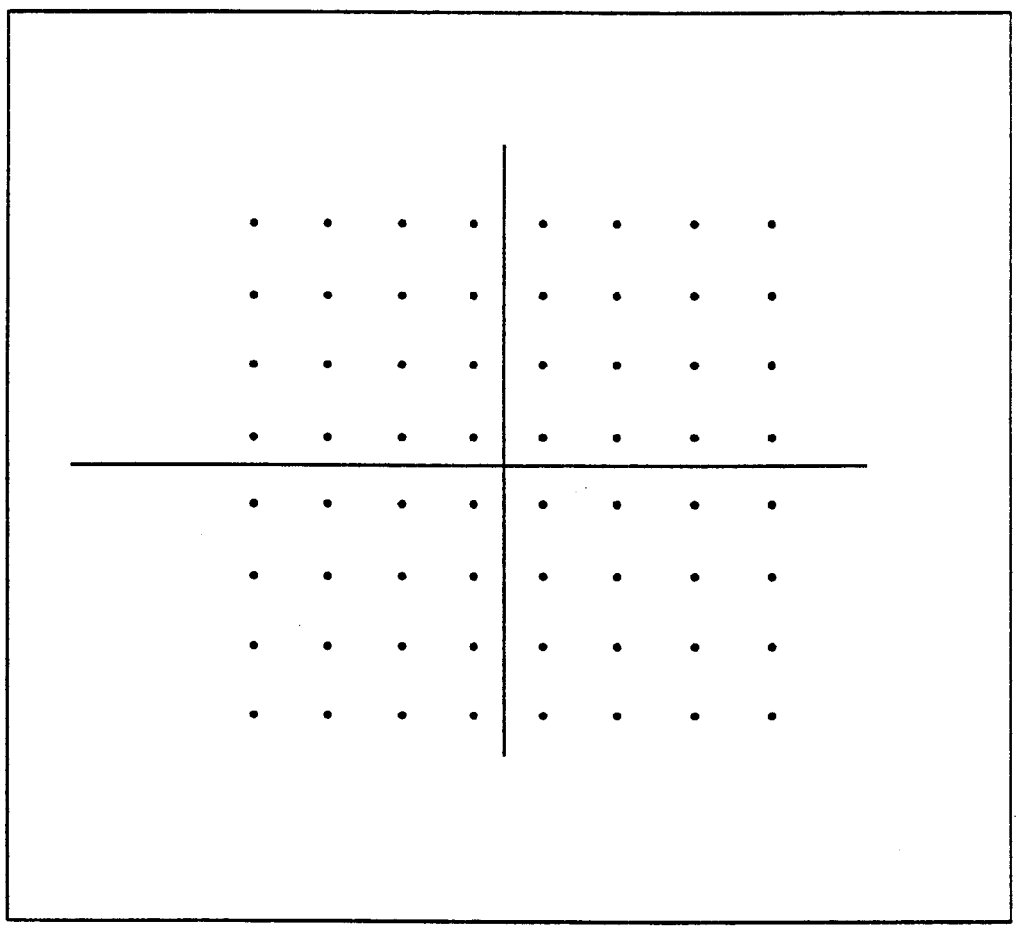
FIG. 2B which depicts a so-called signal constellation for a representative digital modulation scheme, 64 point QAM.

The operation of typical digital communication system 100 will be made clearer by reference to FIG. 2B which depicts a so-called signal constellation for a representative digital modulation scheme 64 point QAM. A signal constellation is a graphical representation of the possible symbols for a given modulation scheme. The horizontal and vertical axes correspond to the orthogonal components of the modulation signal. Each possible symbol is represented by a point at the position of its associated (I,Q) coordinates. As shown in FIG. 2B, 64 point QAM is represented as an array of 64 points. Since $\log_2(64)=6$, the choice of one particular symbol for transmission during a given symbol period communicates 6 bits of information.

Channel 104 introduces noise causing the constellation points to disperse from their ideal locations marked in FIG. 2B. Transmitter filtering and echoing effects within channel 104 introduce inter-symbol interference (ISI) which must be removed by equalization. Also, tuner/downconversion stage 208 introduces residual frequency offset which causes the received signals to "spin" about the origin.

Symbol decision stage 216 essentially receives from adaptive equalizer 214 a series of points in the coordinate space represented by the graph of FIG. 28 and assigns to each point the nearest constellation point as the symbol received. Weight updating stage 220 adjusts equalizer 214 to minimize the distance between the received signal and the constellation point transmitted. Carrier recovery stage 222 operates to minimize the spinning of received points around the origin.

Figure 2C:
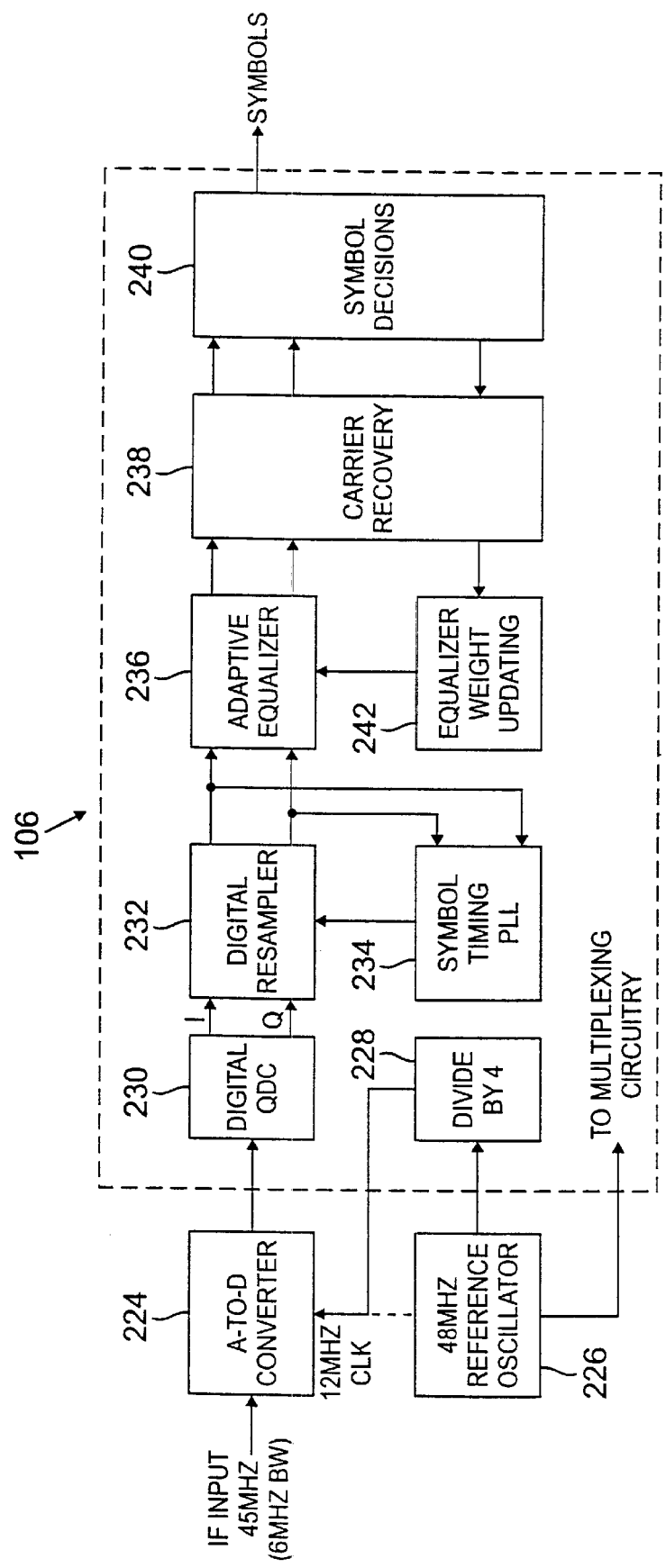
FIG. 2C depicts an alternative implementation of a portion of a digital receiver.

FIG. 2C depicts an alternative implementation of a portion of digital receiver 106 as described in U.S. Pat. No. 5,495,203 issued to Harp et al., EFFICIENT QAM EQUALIZER/DEMODULATOR WITH NON-INTEGER SAMPLING, assigned to the assignee of this application, and the contents of which are herein incorporated by reference for all purposes. This receiver architecture will now be described in brief. An A–D converter 224 corresponds to sampling stage 210 of FIG. 2A but does not operate at baseband but rather accepts an input centered at an IF and samples at a fixed rate determined by a reference oscillator 226 in conjunction with a divide by 4 circuit 228. The fixed sampling rate and IF are chosen in relation to the spectrum of the modulation signal so as to enable digital quadrature direct conversion to baseband by a digital QDC stage 230. A digital resampler 232 synchronizes to the received data in conjunction with a symbol timing phase lock loop 234 analogous to baud timing recovery loop 212. An adaptive equalizer 236 is specially adapted to operate at a sampling rate that is a non-integer fraction of the symbol rate. A carrier recovery stage 238 performs the despinning function directly on the digital data output from equalizer 236 without adjustment of oscillators as in the receiver of FIG. 2A. A symbol decision stage 240 estimates the received data based on the output of carrier recovery stage 238 and generates error signals to drive carrier recovery stage 238 and an equalizer weight updating stage 242.

It can be seen from FIG. 2A and 2C, that digital receivers generate various signals and data that correct for impairments in overall communication system operation. For example, equalizers 214 and 236 correct for echoing and frequency response distortions in channel 104. AGC loop 204 inherently corrects for hum and residual amplitude modulation. The operation of baud timing recovery loop 212, symbol timing PLL 234, and carrier recovery stages 222 and 238, inherently correct for residual frequency modulation, phase noise, drift, and instability, whether these artifacts are introduced at the transmitter or receiver end. Of course, if these various impairments exceed a given level, the receiver will no longer be able to recover the transmitted data at an acceptable bit error rate (BER).

In general FIGS. 2A and 2C are merely representative of possible digital receiver architectures to which the present invention is applicable. Note that some components of digital receiver 106 are not present in every implementation. For example, some implementations use equalizers that do not require weight updating. Other implementations do not employ any kind of equalizer. Many links do not employ channel coding to improve performance and thus do not require a channel decoding stage.

Overview of Diagnostic System

In accordance with one embodiment of the present invention, impairments are non-invasively measured and otherwise characterized by monitoring and analyzing intermediate data and signals generated internal to a digital receiver. The interpretation and availability of these signals will of course vary depending on the internal architecture of the particular digital receiver employed.

Figure 3:
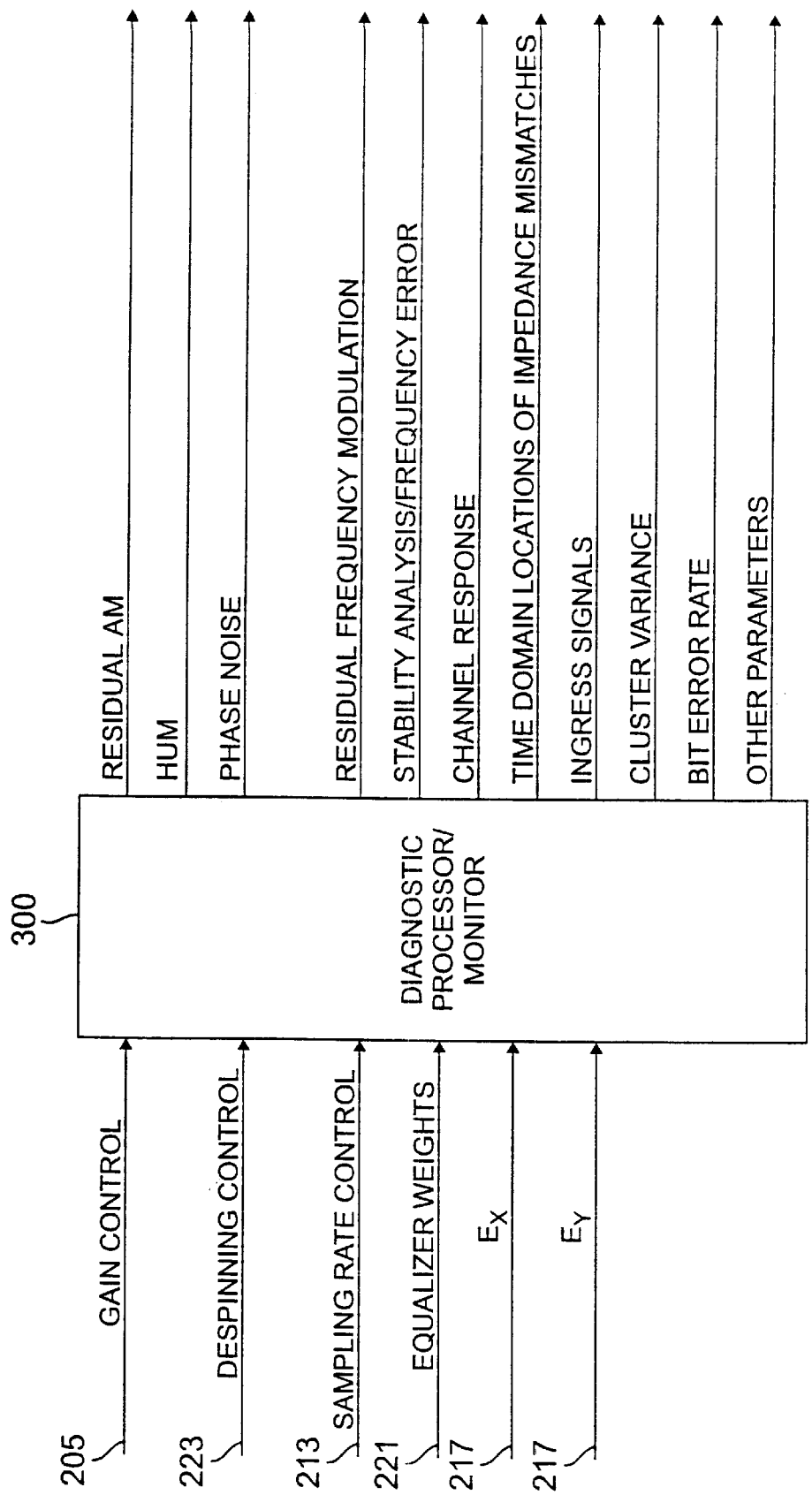
FIG. 3 is a simplified representation of a diagnostic processor/monitor in accordance with one embodiment of the present invention.

FIG. 3 is a simplified representation of a diagnostic processor/monitor 300 in accordance with one embodiment of the present invention. Possible inputs to diagnostic processor/monitor 300 include gain control signal 205 from AGC control circuit 204, a despinning control signal 223 from carrier recovery stage 222, a sampling rate control signal 213 from baud rate recovery loop 212, the-current equalizer weights from adaptive equalizer 214, and the error signals and received symbols generated by symbol decision stage 216. The monitor component of diagnostic processor/ monitor 300 receives all these signals and converts them to a form suitable for analysis. The inputs of FIG. 3 are described in reference to the receiver architecture of FIG. 2A but similar inputs could be obtained from the receiver architecture of FIG. 2C.

From gain control signal 205, equalizer weights 221, and error signal 217, diagnostic processor/monitor 300 generates information about residual amplitude modulation and hum. From despinning control signal 223, equalizer weights 221, and error signal 217, diagnostic processor/monitor 300 generates information about phase noise, residual frequency modulation, frequency error, and frequency stability. From sampling rate control signal 213 and equalizer weights 221, diagnostic processor/monitor 300 generates information about transmitter baud timing. Equalizer weights 221 may be used to generate information about the channel response including the time domain locations of impedance mismatches. Error signal 217 generated by symbol decision stage 216 can be used to recover ingress signals and obtain statistical information such as cluster variance, as defined below, and bit error rate.

Figure 4A:
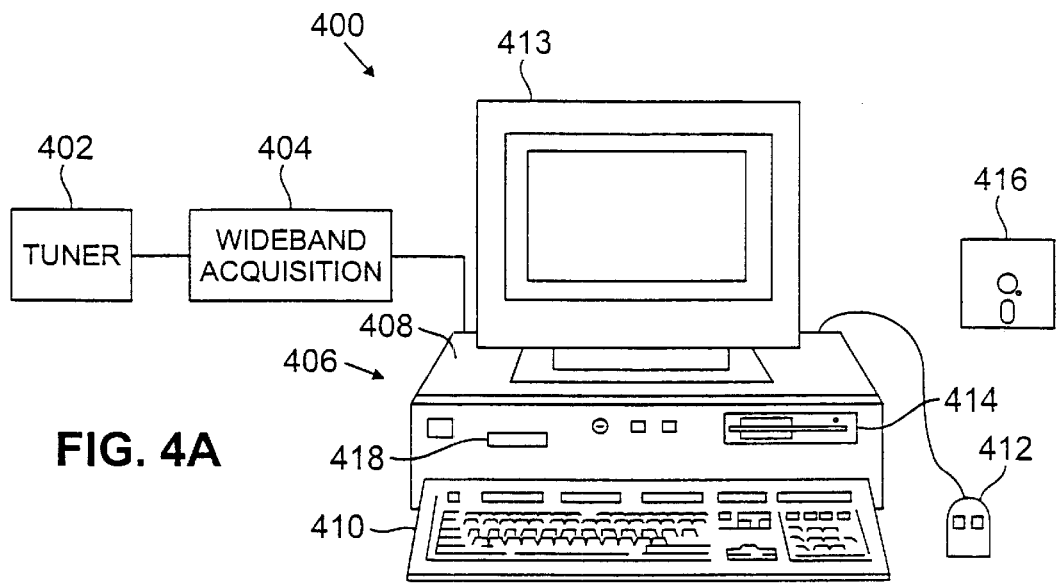
FIG. 4A depicts hardware for implementing a communications link diagnostic system in accordance with a preferred embodiment of the present invention.

FIG. 4A depicts hardware for implementing a communications link diagnostic system 400 in accordance with a preferred embodiment of the present invention. Communications link diagnostic system 400 includes an RF tuner/ downconverter 402, a Model 194 Wideband Signal Acquisition and Playback Unit 404 available from the assignee of this application, and a workstation 406. Tuner/ downconverter 402 receives a signal from channel 104 and is particularized for the band and transmission medium of interest. Tuner/downconverter 402 selects a signal of interest and downconverts it to a predetermined IF. In the preferred embodiment, the IF is 43.75 MHz.

Wideband Signal Acquisition and Playback Unit 404 emulates the operation of the receiver components depicted in FIG. 2A. The IF signal is digitized at up to 250 MHz and captured in an internal snapshot memory. The remaining functions of the receiver of FIG. 2A are performed by workstation 406.

Workstation 406 includes a processing unit 408 containing control elements. A keyboard 410 and a mouse 412 are coupled to processing unit 408 and enable the system user to input commands and data to workstation 406. A display device 413 is provided for displaying test results. Workstation 406 further includes a floppy disk drive 414 adapted to receive a floppy disk 416, and an internal hard drive 418.

Figure 4B:
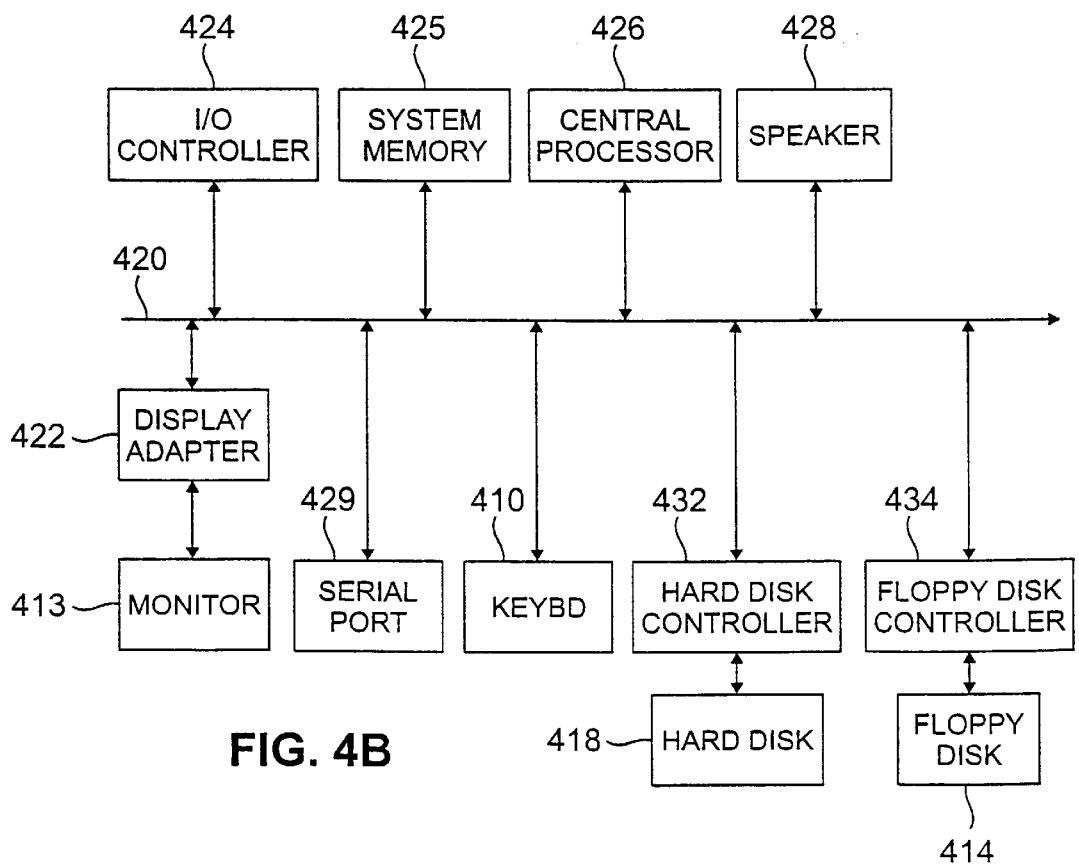
FIG. 4B depicts a system architecture block diagram of a workstation.

FIG. 4B depicts a system architecture block diagram of workstation 406 of FIG. 4A. The system elements are interconnected by a system bus 420 and include a display adapter 422 coupled to display device 413, an I/O controller 424, system memory 425, a central processor (CPU) 426, a speaker 428, a serial port 429, keyboard 410, a hard disk controller 432 coupled to hard disk drive 418, and a floppy disk controller 434 coupled to floppy disk drive 434. CPU 426 controls operation of workstation 406. Program and data information are stored in system memory 424, on floppy disk 416, and on hard disk drive 418.

Analysis software stored in system memory 424, on floppy disk 416, and/or on hard disk drive 418 implements the functionality of diagnostic processor/monitor 300 as well as the functionality of digital receiver 106. Of course any tangible medium including CD-ROM, magnetic tape, flash memory etc. could store this software.

The workstation of FIGS. 4A–4B is merely representative of hardware usable to implement the present invention. In an alternative embodiment, the present invention is implemented as a battery-operated portable system suitable for field work.

In the embodiment shown in FIGS. 4A–4B, Wideband Signal Acquisition and Playback Unit 404 captures sufficient signal information for a full analysis in less than one second. The analysis itself completes in 1–2 minutes. An optional coprocessor card installable within workstation 406 can reduce analysis time to approximately 10 seconds.

In a preferred embodiment, workstation 406 derives and displays on display device 408 combinations of the following: (1) transmission (or propagation) channel response; (2) carrier-to-noise ratio (CNR); (3) spectrum of the underlying noise and any interference signals; (4) phase noise estimates; (5) signal spectrum, signal polar plot, signal constellation and eye diagram (for analyzing intersymbol interference) and (6) other diagnostic displays.

Analysis of Single Channel Response

In accordance with one embodiment of the present invention, the response of channel 104 or a portion of channel 104 may be determined. From the channel response, the operator can determine undesirable multipath, cable, or waveguide mismatching. When channel 104 is the ambient atmosphere, structures such as buildings, vehicles, aircraft, hills, etc., can reflect the transmitted signal such that the transmitted signal is subject to multipath. If channel 104 is a coaxial distribution system, reflections may be caused by impedance mismatches resulting from loose connectors, etc. Receiver 106 receives multiple versions of the transmitted signal at slightly different times due to the differences between the path lengths of the reflected signals and the path length of the transmitted signal. Discovering such reflections is an important aspect of diagnosing a link.

The channel response analysis technique of the present invention will be made clearer by a simplified mathematical characterization of digital communications system 100. The notation used herein follows a standard linear time-invariant model. The conversion of the results to slowly time-varying or somewhat non-linear systems is well-known in the art.

Referring again to FIG. 1, transmitter 102 and associated electronics shape and transmits an input symbol stream $S_n$. Channel 104 carries the output pulses corresponding to the symbol stream, modifying the pulses according to the response of the channel. Referring to FIG. 2A, the components of receiver 106 to the left of adaptive equalizer 214 introduce a further response component. The combined response of transmitter 102, channel 104, and components of receiver 106 to the left of adaptive equalizer 214 can be denoted as H, while the response of adaptive equalizer 214 can be denoted as W. The overall response of the system up to the output of adaptive equalizer 214 can then be written as $$W\ H\ S_n \approx \hat{S}_n + \epsilon, \tag{1}$$

where $\hat{S}_n + \epsilon$ is the output of the equalizer structure and is a noisy estimate of the original symbol stream $\hat{S}_n + \epsilon$.

When communications system 100 is working effectively, $\hat{S}_n + \epsilon$ is a very good estimate of $S_n$, i.e., the received symbols are very close to the same symbols transmitted. In this case, W operating on H as a matrix operator is very close to the identity, I, a matrix operator being defined as an operator which takes one or more vectors, matrices, or tensors as arguments and returns a vector, matrix, or tensor. Thus, the following relationships hold:

$$S_n \approx \hat{S}_n \tag{2}$$

$$W\ H\ S_n \approx \hat{S}_n \Leftrightarrow W\ H \approx I. \tag{3}$$

It then follows that the pseudoinverse of W, W#, is very close to H, the overall system response. One can estimate H as:

$$\hat{H} \approx W\#. \tag{4}$$

Figure 5A:
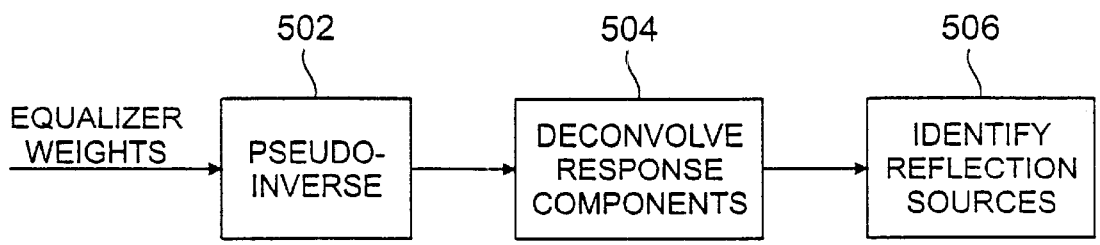
FIG. 5A is a flowchart describing the steps of analyzing a channel response in accordance with one embodiment of the present invention.

FIG. 5A is a flowchart describing the steps of analyzing a channel response in accordance with one embodiment of the present invention. At step 502, the pseudoinverse of the equalizer response is determined using the weights generated by weight updating stage 220.

In one embodiment, the pseudoinverse is computed at step 502 explicitly, using Singular Value Decomposition as is well known to those of skill in the art. Any of a variety of well-known matrix algebraic methodologies could be used.

Figure 5B:
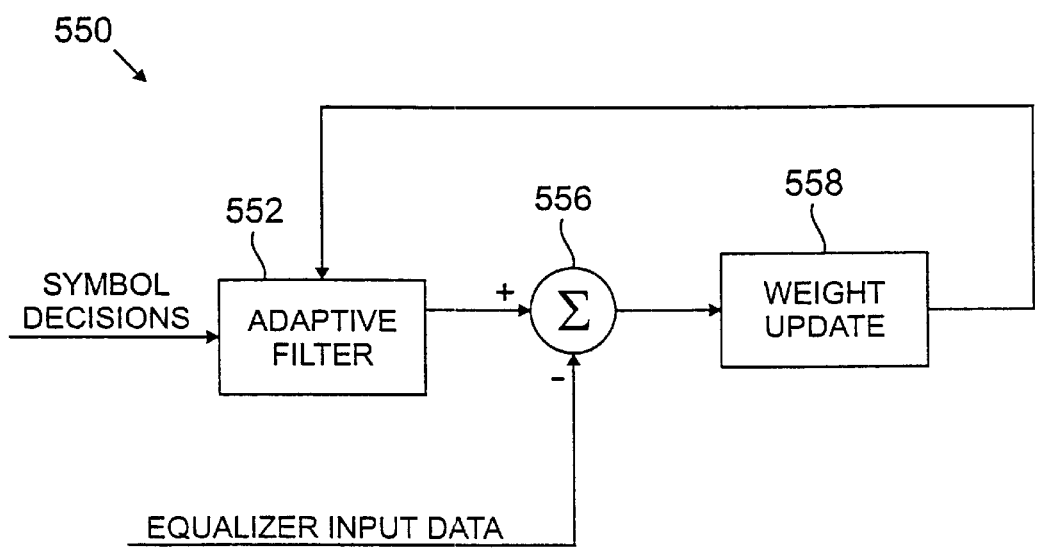
FIG. 5B shows a system for implicitly calculating the pseudo-inverse of an equalizer response in accordance with one embodiment of the present invention.

FIG. 5B shows a system 550 for implicitly calculating the pseudoinverse at step 502. An adaptive filter 552 (distinct from adaptive equalizer 214) receives an ideal modulation signal representing the symbol decisions generated by symbol decision stage 216. The output of adaptive filter 552 is subtracted from the input data to adaptive equalizer 214 within a summer 556. A weight updating stage 558 then operates to modify the tap weights of adaptive filter 552 to minimize the output of summer 556, preferably using the well-known least mean square (LMS) procedure. Since the filter taps have converged, i.e., adapted to a solution such that the error cannot be further minimized and the error is acceptably small enough, the response of adaptive filter 552 matches the overall system response. It has been found that the channel can be modeled with residual errors 35–40 dB below the level of the channel response.

Once a pseudoinverse is computed as an estimate of the overall system response H, particular components of the system response may be isolated, at step 504. For many communications systems, the response of the transmitter 102, the pre-equalizer components of receiver 106, or both are well known. In these cases, the known responses can be deconvolved from $\hat{H}$, leaving an estimate of the channel response alone.

Furthermore, there may also be known portions of the response of channel 104 that may be deconvolved to focus on a particular portion of interest. For example, it may be desirable to analyze only the portion of a coaxial cable system lying within a subscriber's home. Once a desired response is obtained, it may be shown on display device 508.

In accordance with the invention, an all-pass portion of the response of a channel component of interest may be isolated at step 506 to identify the locations of reflections. The time domain representation of the all-pass component will show the locations of individual reflections which could be caused by e.g., loose connectors. In accordance with the invention, the allpass portion of the response may be obtained without exact knowledge of the frequency-dependent amplitude response by using homomorphic signal processing or parametric signal processing.

Homomorphic signal processing is a method by which a signal is decomposed into an all-pass component and a minimum-phase component. This decomposition can be performed using techniques well known to those skilled in the art, including methods described in [Oppenheim89] and [IEEE79], the contents of which are herein expressly incorporated by reference for all purposes. In the case where the input signal consists of a signal corrupted by micro-reflections, the minimum-phase portion of the signal will contain a representation of the spectrum of the direct arrival of the desired signal, while the all-pass portion will contain a representation of the impulse response of the channel's micro-reflections.

In cases where the ideal (uncorrupted) channel response is known, or can be reasonably estimated, parametric signal processing techniques may be employed to better estimate the corrupted channel response. In using parametric approaches, a model for the corrupted channel response is hypothesized. This model includes several unknown parameters, such as time-of-arrival and amplitude of micro-reflections. The values for each of these parameters may then be determined in any number of methods well known to those skilled in the art, including Maximum Likelihood, Maximum Entropy, Minimum Variance, etc. Details of these methods, as known to those of skill in the art, may be found throughout the literature, including [VanTrees68], [Haykin83], [Haykin85], [Haykin91], and [Marple87], all the contents of these references being herein expressly incorporated by reference for all purposes.

Thus, the locations of individual reflections may be obtained without resort to invasive probing of the system while it is operating. This is an important advantage over prior art time domain reflectometry techniques which require that normal operation be interrupted.

The resolution of the above-described system in locating reflection sources is limited by the effective temporal resolution of the equalizer. For a simple finite impulse response (FIR) structure, the effective temporal resolution is directly related to the tap spacing. If standard processing approaches are utilized, a typical T- or T/2-spaced equalizer is limited to a resolution of T or T/2, respectively, where T is equal to the symbol period. For typical digital cable television (CATV) applications, a 5 MBaud, T/2-spaced equalizer would have a temporal resolution of 100 ns. This translates to a resolution of about 24 meters (m) in typical coaxial cable.

In accordance with one embodiment of the invention, by employing a non-integer, fractionally-spaced equalizer, the temporal resolution can be increased by interpreting the equalizer as a polyphase structure. In such systems, the sample rate is approximately equal to (2*N*K/L) times the symbol rate where 2*L>K>L, and K, L, and N are integers. In the case of a T/1.2-spaced equalizer, as is described in the Harp et al. patent, the resulting temporal resolution is T/6. For a 5 MBaud system, this would provide a 33 ns resolution, better than 8 m in the same coaxial cable where only 24 m was the resolution available using a T/2-spaced equalizer. Other spacings can provide even better resolution than that of a T/1.2 equalizer, though usually at the expense of greater computational complexity.

With a T/1.2-spaced equalizer, one can visualize the structure as a linear, time-varying system comprised of five distinct equalizer phases. Each of these phases is used in turn as each new sample is received. Without loss of generality, the first of these phases (Phase 0) is assigned a relative delay of 0 and is responsible for providing an output corresponding to some symbol sent at t=0. The next phase (Phase 1) of the equalizer is then responsible for predicting the symbol sent at t=T, but using samples collected with a relative delay of 5T/6. Thus the taps of Phase 1 are effectively T/6 (T−5T/6) advanced relative to those in Phase 0. Similarly, the remaining phases are advanced by T/6 from the previous phase. This relationship may be summarized as in Table 1:

TABLE 1

Relative Delay/T

| Phase | Tap 0 | 1 | 2 | 3 | 4 | 5 | 6 | 7 | ... |
|---|---|---|---|---|---|---|---|---|---|
| 0 | 0/6 | 5/6 | 10/6 | 15/6 | 20/6 | 25/6 | 30/6 | 35/6 | ... |
| 1 | −1/6 | 4/6 | 9/6 | 14/6 | 19/6 | 24/6 | 29/6 | 34/6 | ... |
| 2 | −2/6 | 3/6 | 8/6 | 13/6 | 18/6 | 23/6 | 28/6 | 33/6 | ... |
| 3 | −3/6 | 2/6 | 7/6 | 12/6 | 17/6 | 22/6 | 27/6 | 32/6 | ... |
| 4 | −4/6 | 1/6 | 6/6 | 11/6 | 16/6 | 21/6 | 26/6 | 31/6 | ... |

As shown in this table, the relative delay decreases by T/6 from phase to phase, and increases by 5T/6 from tap to tap. As can also be seen from this table, by properly ordering the N taps of the entire equalizer structure, all relative delays from −4T/6 up through (N-5) T/6 in increments of T/6 are available. This defines the response of the equalizer with a resolution of T/6 (<0.17 T); three times better than that obtainable with T/2 equalizers and their inherent 0.5 T resolution.

Analysis of Multi-Frequency Multi-Channel Response

Even finer resolution in identifying reflection sources is obtainable by making measurements at multiple frequencies across the bandwidth of the entire cable system as opposed to monitoring a single signal. The cable system bandwidth is typically 200 MHz to 1 GHz. For a 500 MHz system, reflection sources may be localized to within 0.7 m.

Figure 5C:
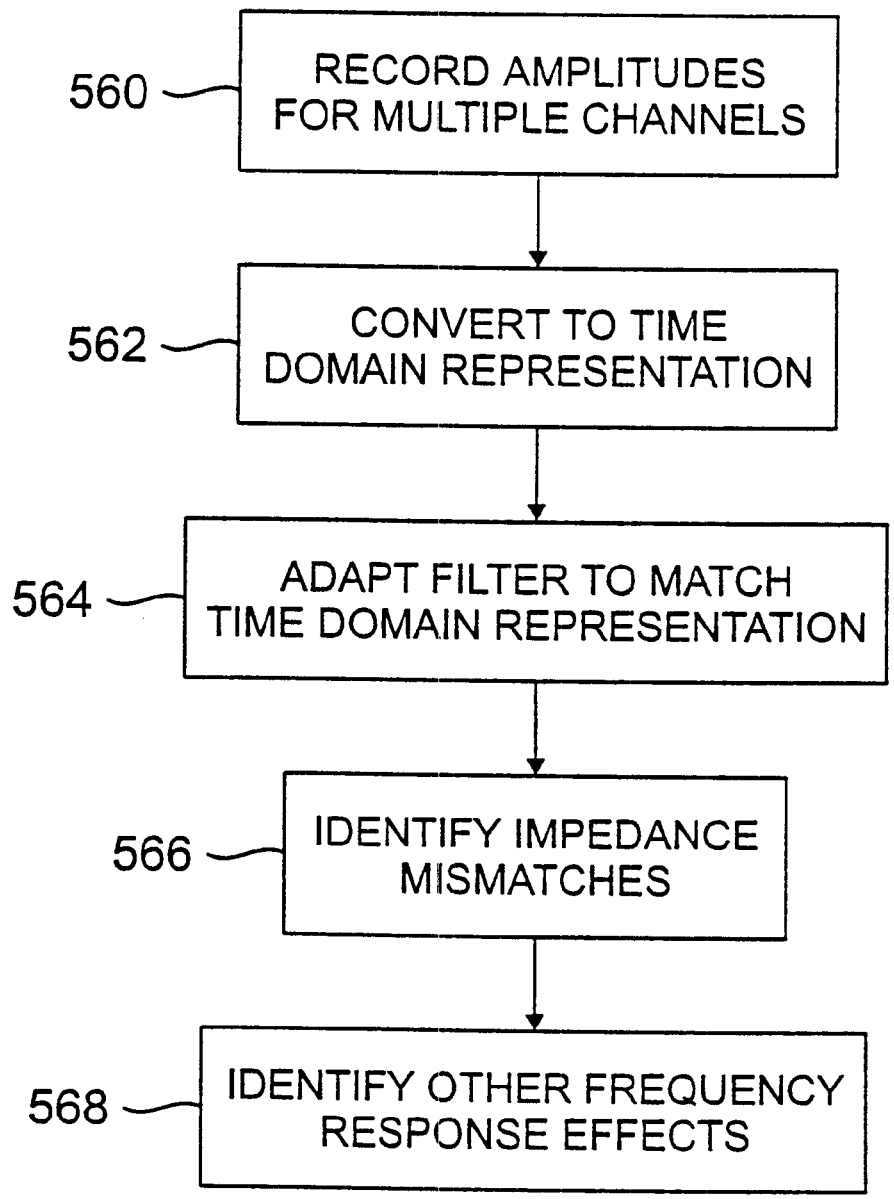
FIG. 5C is a flowchart describing steps of analyzing a channel response by making measurements at multiple frequencies in accordance with one embodiment of the present invention.

FIG. 5C is a flowchart describing steps of analyzing a channel response by making measurements at multiple frequencies in accordance with one embodiment of the present invention. At step 560, the preferred embodiment measures envelope amplitude for each signal carried by the cable system. Typically, a measurement is made every 6 MHz by tuning receiver 106 to each channel. The amplitude measurement must be made at a stage of receiver 106 prior to the circuitry shown in FIGS. 2A and 2C, e.g., at the input to gain stage 202. The result of step 560 is a list of frequencies and measured amplitudes.

At step 562, the list of frequencies and measured amplitudes is converted into the time domain by applying an FFT (Fast Fourier Transform). This results in a time domain representation of the signal measured over an aggregation of the frequencies. At step 564, an impulse is repeatedly fed into an adaptive digital filter. The adaptive filter operates to modify its transfer function to force its output to equal the time domain representation developed in step 562. The adaptation method is preferably the well-known gradient descent algorithm. In one embodiment, the adaptive digital filter is an all-pole filter, and adaptation includes positioning only the poles of the transfer function. In another embodiment, the adaptive digital filter includes zeroes as well which are positioned during adaptation.

The adaptation process forces the response of the adaptive digital filter to approximate the response of channel 104 as measured across the entire system bandwidth. This is an example of parametric signal processing. At step 566, the adaptive digital filter response is converted to the time domain. If the filter response includes both poles and zeroes, only the "poles" component of the response need be converted to the time domain for this purpose. The resulting time domain representation of the poles or "resonances" will show pulses corresponding to the locations of impedance mismatches, as caused by, e.g., loose or corroded connectors.

At step 568, if the filter response includes zeroes as well, the "zeroes" component of the response is isolated and displayed in the frequency domain. This shows the effects of shaping filters in transmitter 102, filters used at intermediate points in channel 104 and any other filter frequency response distortions along the way.

Localization of Channel Impairments

Figure 5D:
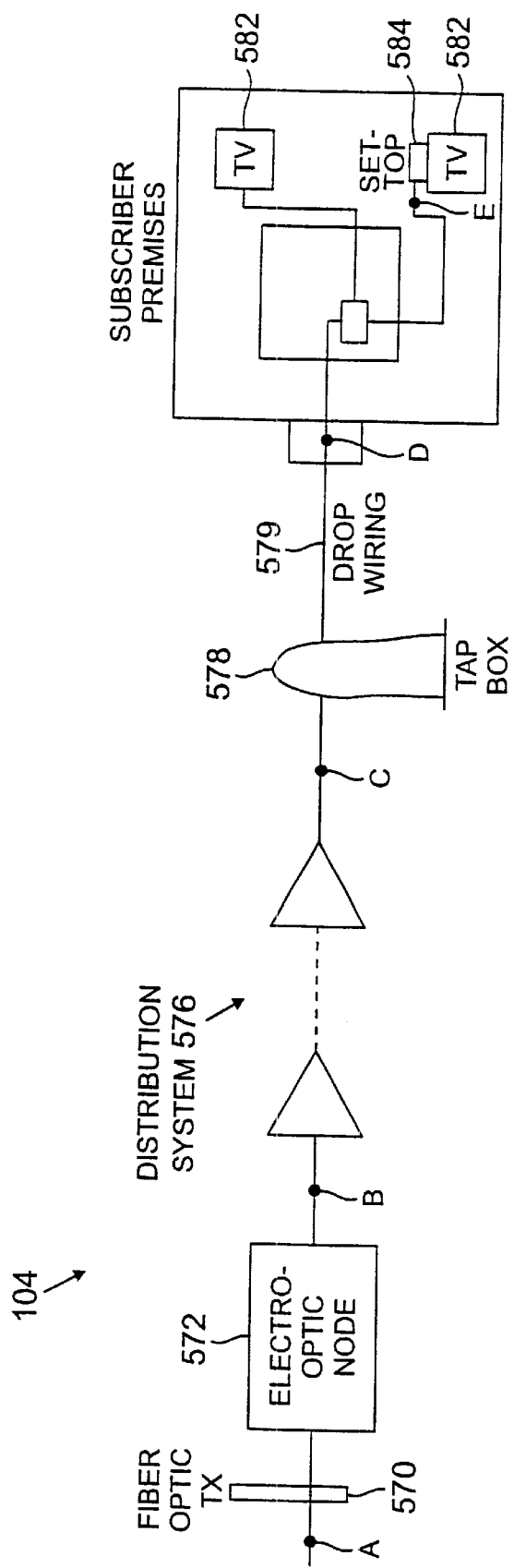
FIG. 5D depicts a typical structure of a channel in the context of an HFC (hybrid fiber cable) system.

Generally, accurate identification of the location of an impedance mismatch requires isolation of a portion of the response of channel 104. FIG. 5D depicts a typical structure of channel 104 in the context of an HFC (hybrid fiber cable) system. A fiber-optic transmitter 570 transmits optical energy to an electro-optical node 572 Electro-optical node 572 transmits signals through a distribution system 576 to a tap box 578. At tap box 578, an electrical signal is tapped off for transmission through drop wiring 579 to premises 580 of a particular subscriber. Premises 580 include televisions 582 and a set-top unit 584 implementing receiver 106.

In FIG. 5D, nodes A–E represent points where the signal may be tapped off and monitored to identify the channel response up to that point, by any of the procedures discussed in reference to FIGS. 5A–5C. To isolate a particular segment of channel 104, responses are obtained at a node following the segment and a node preceding the segment. To obtain the response of the optical system represented by fiber-optic transmitter 570 and electro-optical node 572, the response obtained at node A is deconvolved from the response obtained at node B. To obtain the response of distribution system 576, the response obtained at node B is deconvolved from the response obtained at node C. To obtain the response of drop wiring 579, the response obtained at node C is deconvolved from the response obtained at node D. To obtain the response of the wiring inside subscriber premises, the response obtained at node D is deconvolved from the response obtained at node E.

Analysis of Error Signal

In accordance with the invention, diagnostic processor/monitor 300 receives error signal 217 corresponding to the difference between an ideal modulation signal representing the output estimates and the input of symbol decision stage 216. For systems that employ channel coding, an alternative way to generate the error signal is to reencode the decoded output of channel decoding stage 218 and form an ideal modulation signal representing this corrected encoded data. The error signal is then the difference between this encoded data and the input of symbol decision stage 216.

FIG. 6A is a block diagram describing various modes of taking advantage of error signal 217 which represents ingress interference in communications channel 104. One possibility is direct display of the error signal in the time domain. An operator able to view this display may be able to recognize the source of ingress error as for example, 60 Hz line noise. Burst errors or other time varying phenomena may be identified. Alternatively, it may be useful to convert the signal into the frequency domain (block 602) using well-known techniques prior to display. This provides the equivalent of a spectrum analyzer on an unoccupied channel. A frequency domain display may show the presence of ingress interference from an AM or FM broadcast signal leaking into the cable system, for example.

The ingress display can also be normalized to the signal power to display the power spectral density of the ingress signal relative to the signal power. The signal power may be obtained at the output of adaptive equalizer 214 or 236. This signal power then is used to generate a reference power level on the frequency display (e.g., 0 dBc or decibels relative to the signal or carrier power). The ingress power is then plotted (block 604) as a spectral density relative to the signal power (e.g., −40 dBc/Hz) or as a power in the resolution bandwidth of the display. For example, if the resolution bandwidth is 1 kHz, the −40 dBc/Hz above is multiplied by 1000 Hz (30 dB) to obtain the ingress power of −10 dBc.

The ingress display can be further corrected for adjustments made in the equalization by adjusting in the frequency domain for the influence of the equalizer spectral response on the ingress signals to determine the original ingress power prior to equalization processing.

Alternatively, statistics of error signal 217 may be computed (block 604) in relation to the symbol stream output from symbol decision stage 216 to develop indicia of link quality. One extremely useful measure of quality is the "cluster variance" (CV). The cluster variance is the ratio of the variance of the power in the error signal to the power in the symbol stream.

Cluster Variance Based on Error Signal Analysis

The cluster variance is measured around the demodulated signal constellation point (e.g., at the output of equalizer 214 or equalizer 236) and is generally considered to be the power of the signal divided by the sum of the power of the in-phase error plus the power of the quadrature error. Alternatively, the cluster variance may be measured based on a modulated signal carrying a reencoded version of the data output from channel decoding stage 218. The cluster variance represents an estimate of the signal-to-distortion power ratio. Depending on the distortion type and severity, the bit error rate (BER) can be calculated as a function of the signal-to-distortion power ratio or cluster variance.

Precise calculation of the signal margin (the difference between the signal-to-noise (SNR) ratio at the required BER vs. the actual SNR for a given impairment) in accordance with the present invention is discussed below. However, the present invention also provides for a simplified calculation of BER and signal margin directly from the cluster variance based on the recognition that in most cases distortion can be considered to have an approximately Gaussian distribution and be independent. The Gaussian assumption holds generally in digital cable systems since the equalizers and other filtering elements operate as "summers" and in accordance with the well-known Central Limit Theorem cause arbitrary probability distributions to become Gaussian. The independence assumption also holds for digital cable systems because they generally incorporate large interleavers or error randomizers that break up burst errors (or distortions that might cause burst or cause dependence of the errors) and randomize them resulting in independence of error events.

Bit Error Rate Based on Error Signal Analysis

One embodiment of the present invention makes use of the above two assumptions and approximates the signal-to-noise ratio (SNR) to be the cluster variance. Each modulation scheme has an associated BER vs SNR graph which is used to estimate the BER from the measured cluster variance. The signal margin may be estimated similarly. For systems that make use of error correction, the post-decoded bit error rate (DBER) is estimated by first computing the pre-decoded error rate from the cluster variance and applying the input vs output error rate curves for a given decoder to compute the output error rate of the decoder. Curves for a variety of error correcting codes are efficiently stored in a look-up table within block 604. There is no need to simulate the operation of the decoder.

Coarse System Margin Approximation Based on Error Signal Analysis

Avoiding simulation of decoder operation produces great benefits in determining margin under low error rate conditions. This is because measuring low error rates can be very long and tedious. With powerful error-correction coding, reasonably short measurements will produce either zero errors above the SNR threshold or a 50% bit error rate below the SNR threshold, due to the breakdown of the error-correction coding scheme. This gives very little indication of available margin. However, subtracting a required system SNR from the SNR estimate derived from the cluster variance yields a useful estimate of the available margin. A technique for obtaining a more accurate estimate of system margin is discussed below.

Precise Evaluation of System Margin by Analysis of Error Signal

A more refined estimate of system margin may be obtained in accordance with one embodiment of the present invention. This is done by separating the component of the error signal which is caused by broadband noise from the components caused by narrow-band interferers, residual amplitude modulation, and residual phase modulation.

Figure 7A:
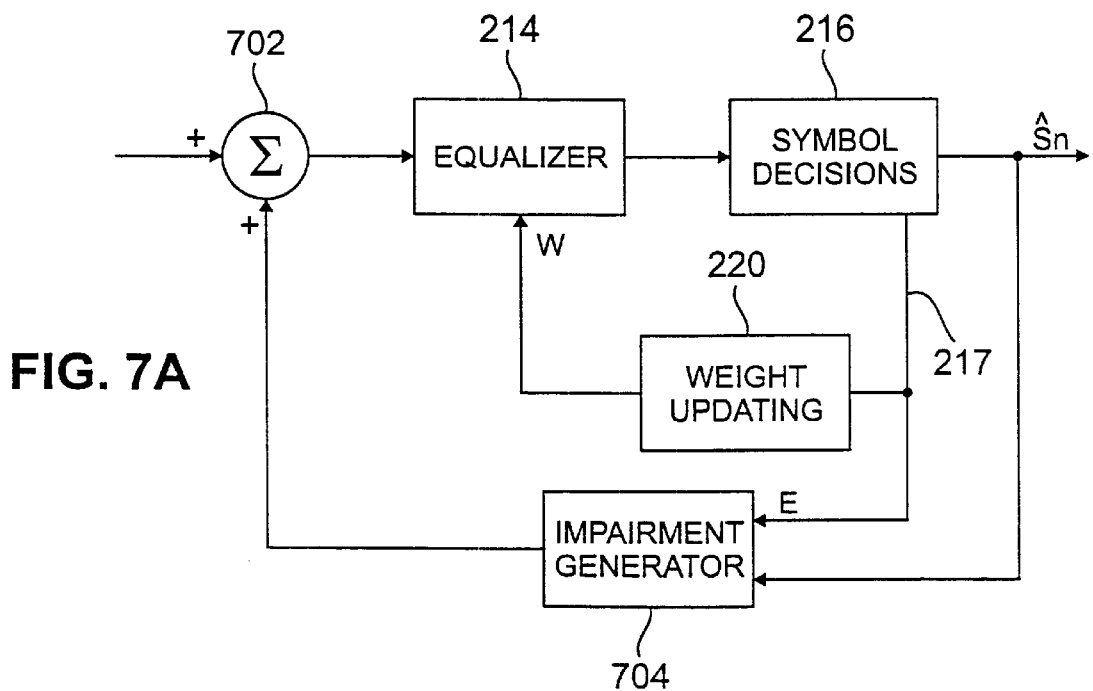
FIGS. 7A–7B are diagrams illustrating how system margin may be tested non-invasively in accordance with one embodiment of the present invention.
Figure 7B:
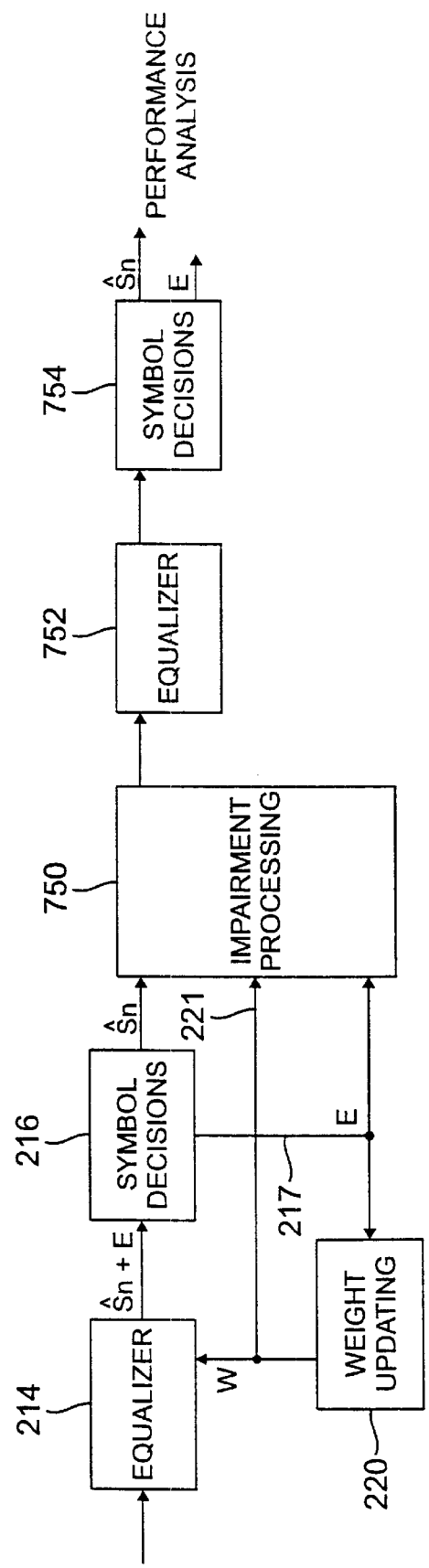
Figure 7C:
FIG. 7C is a diagram illustrating the effect of broadband noise on a particular constellation point as received.
Figure 7D:
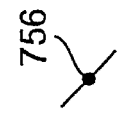
FIG. 7D is a diagram illustrating the effect of a narrow-band interferer on a particular constellation point as received.

FIG. 7C depicts a constellation point 756 as affected by broadband noise only. Ideally, constellation point 756 would be a dimensionless point but the effect of broadband noise is to diffuse the received constellation point into a disk. FIG. 7D depicts constellation point 756 as affected by a narrowband interferer. The effect of the narrowband interferer is to create a ring 758 having the ideal location of constellation point 756 as a center.

Figure 7E:
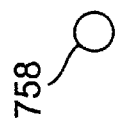
FIG. 7E is a diagram illustrating the effect of residual phase noise on a particular constellation point as received.

FIG. 7E depicts constellation point 756 as affected by residual phase modulation. FIG. 7E assumes that constellation point 758 is in either the upper right or lower left quadrant of a constellation such as the constellation in FIG. 2B and located on a line through the origin at roughly a 45 degree angle to the axes. The effect of residual phase modulation is to disperse the received constellation point in a direction tangent to a circle including constellation point 756 and having the origin of FIG. 2B as a center. It should be noted that the residual phase modulation of FIG. 7E will not include errors corrected for by carrier recovery stages 222 or 238.

Figure 7F:
FIG. 7F is a diagram illustrating the effect of residual amplitude modulation on a particular constellation point as received.

FIG. 7F depicts constellation point 756 as affected by residual amplitude modulation. The same constellation geometry assumptions made in reference to FIG. 7E also apply to FIG. 7F. The effect of residual amplitude modulation is to disperse the received constellation point in a direction perpendicular to a circle including constellation point 756 and having the origin of FIG. 2B as a center. It should be noted that the residual amplitude modulation of FIG. 7F will not include the errors corrected for by AGC stage 204.

For an actual received signal, the errors of FIGS. 7C–7F will be combined. The present invention provides a technique for isolating these errors.

Figure 7H:
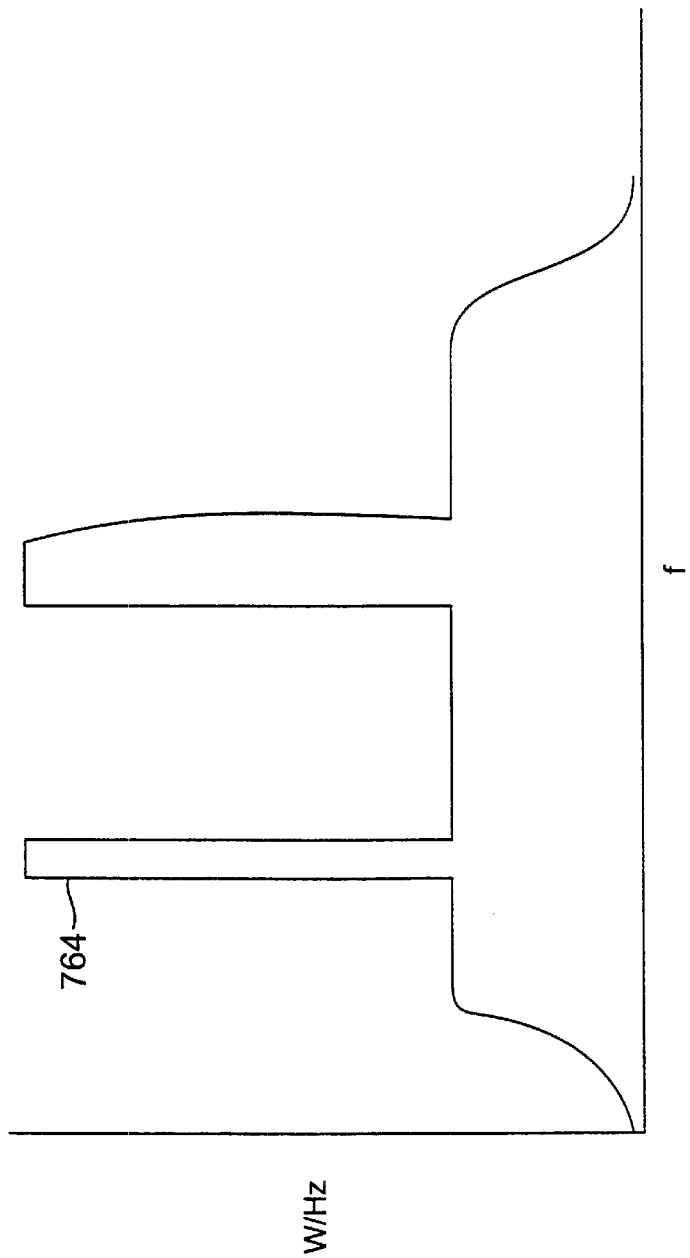
FIG. 7H is a diagram depicting narrowband interference superimposed on a digital signal.
Figure 7G:
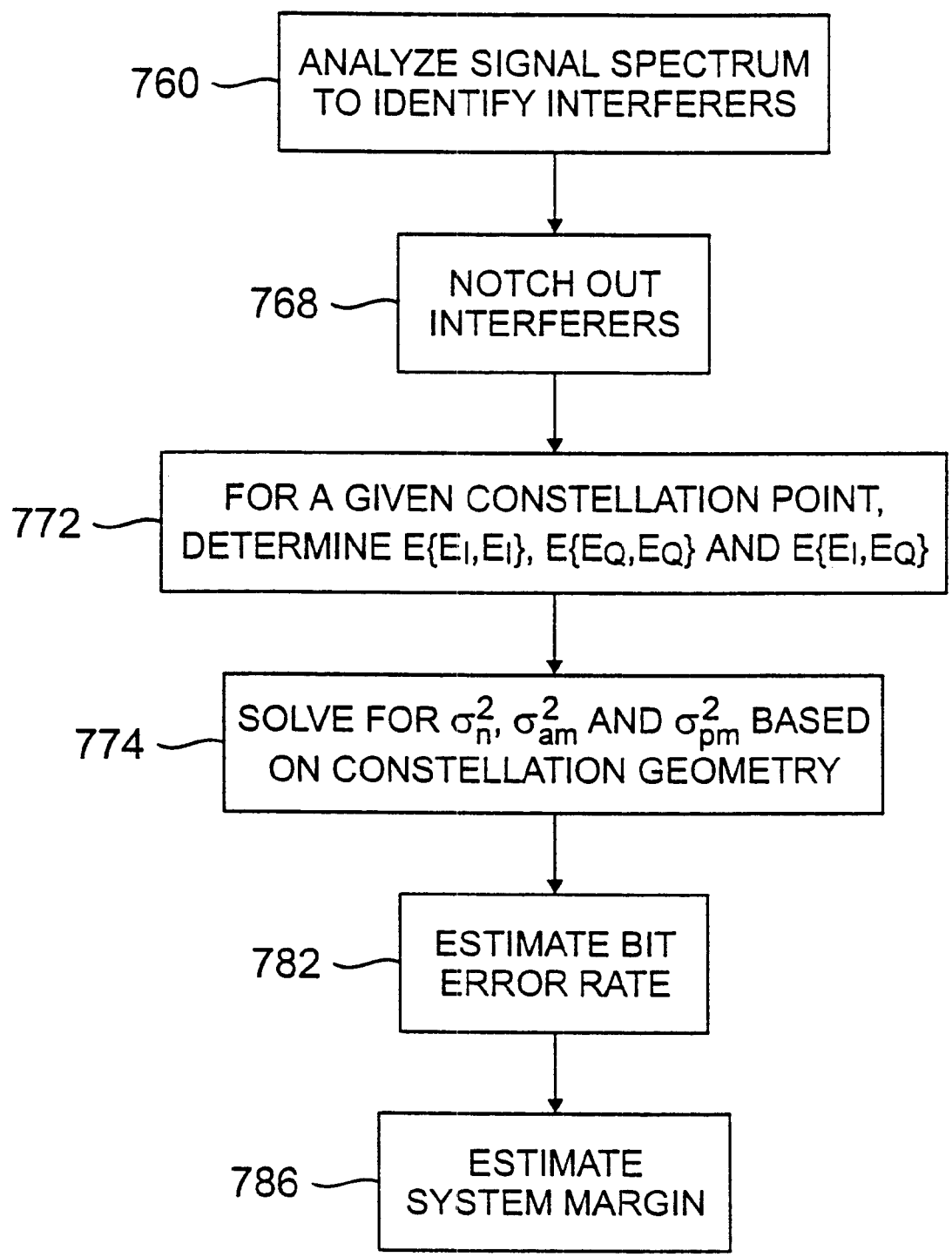
FIG. 7G is a flowchart describing steps of analyzing an error signal to estimate system margin and obtain other system information in accordance with one embodiment of the present invention.
Figure 7I:
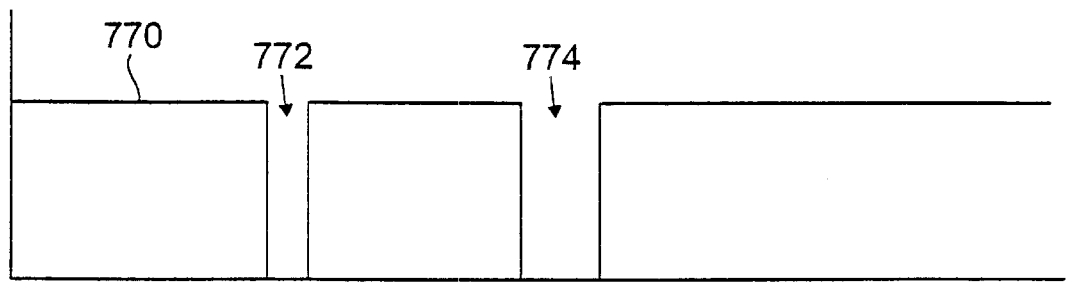
FIG. 7I is a diagram depicting the response of a notch filter for removing narrowband interference in accordance with one embodiment of the present invention.

FIG. 7G is a flowchart describing steps of analyzing an error signal to estimate system margin and obtain other system information in accordance with one embodiment of the present invention. At step 760, the preferred embodiment analyzes the spectrum of the received signal as would be present, e.g., on the output of carrier recovery stage 238 or adaptive equalizer 214 to identify interferers. FIG. 7H depicts such a spectrum 762 showing two narrow band interferers 764 and 766. Any narrowband signal having greater than three times the median magnitude of spectrum 762 is considered to be an interferer. At step 768, a notch filter as shown in FIG. 7I is applied to remove the narrow band interference. Referring to FIG. 7I, a notch filter response 770 is constructed so as to remove the interferers identified in step 760. Notch filter response 770 includes nulls 772 and 774 corresponding to the frequency and bandwidth of narrowband interferers 764 and 766 respectively. FIG. 7I of course shows ideal filter performance.

At step 772, the preferred embodiment performs statistical analysis on samples from the two-dimensional error signal 217 corresponding to a selected constellation point, an in-phase error correlation signal $E\{\epsilon_I \epsilon_I\}$ corresponding to variance along the in-phase (horizontal) axis, a quadrature error correlation signal $E\{\epsilon_Q \epsilon_Q\}$ corresponding to variance along the quadrature (vertical) axis, and an error cross-correlation signal $E\{\epsilon_I \epsilon_Q\}$ corresponding to the cross-correlation between error samples along the in-phase and quadrature axes.

Figure 7J:
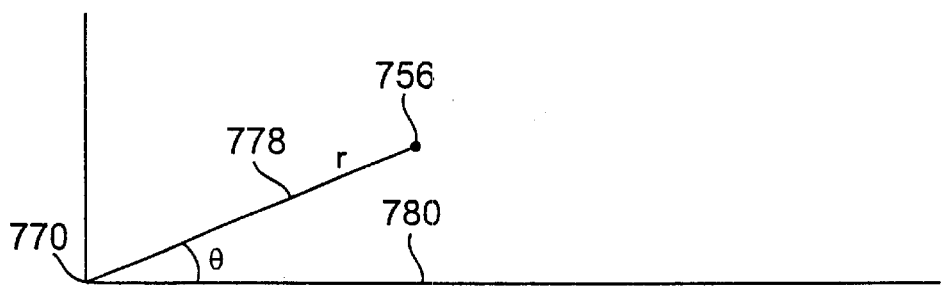
FIG. 7J is a diagram depicting the geometry of a particular constellation point.

At step 774, the preferred embodiment determines $\sigma^2_{AM}$, corresponding to the amount of residual AM, $\sigma^2_{PM}$ corresponding to the amount of residual PM, and $\sigma^2_N$ corresponding to the amount of wideband noise based on the correlation signals computed in step 772. Step 774 takes advantage of a relationship among $E\{\epsilon_I \epsilon_I\}$, $E\{\epsilon_Q \epsilon_Q\}$, $E\{\epsilon_I \epsilon_Q\}$, $\sigma^2_{AM}$, $\sigma^2_{PM}$, and $\sigma^2_N$ determined by the position of the selected constellation point in relationship to an origin 776. Referring now to FIG. 7J, constellation point 756 lies at a distance r from the origin and a vector 778 from origin 776 to constellation point 756 is at an angle θ to a horizontal axis 780. Accordingly, the following relationships will hold:

$$E\{\epsilon_I \epsilon_I\} = \sigma^2_I + (r\cos\theta)^2 \sigma^2_{AM} + (r\sin\theta)^2 \sigma^2_{PM} \quad (1)$$

$$E\{\epsilon_Q \epsilon_Q\} = \sigma^2_Q + (r\sin\theta)^2 \sigma^2_{AM} + (r\cos\theta)^2 \sigma^2_{PM} \quad (2)$$

$$E\{\epsilon_I \epsilon_Q\} = r^2 \sin\theta \cos\theta (\sigma^2_{AM} - \sigma^2_{PM}) \text{ where} \quad (3)$$

$\sigma^2_I$ and $\sigma^2_Q$ are the in-phase and quadrature components of the broadband noise respectively, and are each equal to $\sigma^2_N/2$. The preferred embodiment solves for $\sigma^2_{AM}$, $\sigma^2_{PM}$, and $\sigma^2_N$ using the above equations.

Figure 7K:
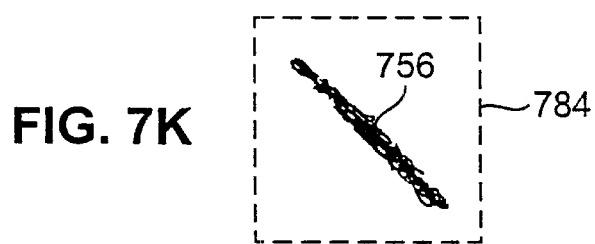
FIG. 7K is a diagram depicting a constellation point as affected by more than one type of impairment.

At step 782, the preferred embodiment uses its knowledge of $\sigma^2_{AM}$, $\sigma^2_{PM}$, and $\sigma^2_N$ to compute the bit error rate. Referring now to FIG. 7K, a decision region 784 surrounding ideal constellation point 756 is shown. Constellation point 756 is shown with a combination of mostly residual phase modulation with some broadband noise added. As long as the constellation point representing the received noisy signal falls within the boundaries of decision region 784, the originally transmitted symbol will be correctly identified by the receiver. To evaluate the probability of an error occurring, the preferred embodiment runs a Monte Carlo simulation where the ideal transmitted constellation point is summed with pseudo-randomly chosen values corresponding to simulated broadband noise, residual amplitude modulation, and residual frequency modulation with distributions defined in part by the $\sigma^2_{AM}$, $\sigma^2_{PM}$, and $\sigma^2_N$ values identified in step 780. The broadband noise and residual phase modulations are assumed to have Gaussian distributions variances $\sigma^2_N$, and $\sigma^2_{PM}$ respectively. The residual amplitude modulation is modeled as an (e.g., 120 Hz) periodic random process with an amplitude defined by $\sigma^2_{AM}$. A simulated received point falling outside decision region 784 is considered an error. The bit error rate is determined in this way and displayed. The bit error rate simulation may be refined by taking into account the effects of channel coding by applying simulated channel coding and decoding.

At step 786, the preferred embodiment evaluates the system margin, determining the amount of extra broadband noise, residual amplitude modulation, and residual phase modulation that can be tolerated before the bit error rate rises above an unacceptable threshold. This is done by repeating the Monte Carlo simulation described in reference to step 782 for combinations of elevated values of $\sigma^2_{AM}$, $\sigma^2_{PM}$, and $\sigma^2_N$. The combinations for which the bit error rate is equivalent to the threshold define a three-dimensional surface which may also be displayed to graphically illustrate to the operator how much further system degradation is tolerable.

In summary, the system margin is calculated as the amount of noise power that can be added while maintaining BER at its threshold value while considering the cumulative effect of other impairments. The present invention, however, also provides estimates of the degree to which non-noise impairments may be increased before bringing BER above threshold.

Figure 6B:
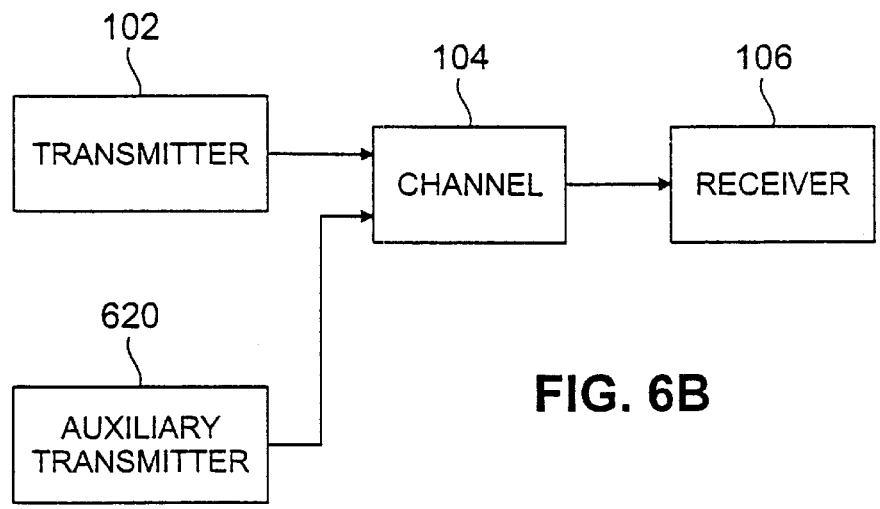
FIG. 6B depicts a communications channel with an additional ingress signal being injected by a second digital transmitter.

Demodulation of the error signal (block 606) may also be useful. Converting the demodulated signal to audio may allow ready identification of broadcast interference. Alternatively, the demodulated error signal may be used to recover one or more deliberately injected in-band ingress carriers. If the level of these carriers is sufficiently low (e.g., −27 dBc for 64-QAM), the digital carrier is not appreciably disturbed. FIG. 6B depicts communications channel 104 with an additional ingress signal being injected by a second digital transmitter 620.

Evaluation of System Margin by Applying a Synthetic Impairment

FIGS. 7A–7B are diagrams illustrating how system margin may be tested non-invasively in accordance with one embodiment of the present invention. FIG. 7A depicts one approach to testing system margin. A summer 702 is inserted prior to adaptive equalizer 214 to add in an impairment signal. The output of symbol decision stage 216 can then be analyzed to measure the deterioration in performance that results from the impairment signal in the manner described in connection to FIG. 6A.

An impairment generator 704 generates the impairment from error signal 217 generated by symbol decision stage 216. One approach is simply to amplify error signal 217 which represents the existing interferers within impairment generator 704 until the bit error rate becomes unsatisfactory. The degree of amplification necessary to produce this level of signal quality degradation then represents how much more of the current interference can be tolerated. Alternatively, filtering could be applied within impairment generator 704 to isolate a particular type of interference to be re-applied to the signal and determine how much more of this interference could be tolerated. Another alternative is to apply additive noise through summer 702 and determine how much noise is necessary to disrupt communication. One or more reflections may be simulated by using impairment generator 704 to delay a reconstruction of the transmitted signal based on the symbol estimates. Also, if desired, only a particular spectral portion of the reconstruction may be delayed in this way.

FIG. 7B depicts an alternative approach to estimating system margin. An impairment processor 750 may apply various form of signal impairment to a reconstruction of the transmitted signal based on the output of symbol decision stage 216. If forward error correction is being used, impairment processor 750 may instead use the corrected data as input and re-apply the relevant code prior to further processing. Impairment processor 750 may apply additive impairments as in FIG. 7A or may apply a simulated channel response. The output of impairment processor 750 is applied to an equalizer 752 similar to equalizer 214. (The updating of the weights of equalizer 752 is not shown.) Equalizer 752 thus seeks to correct for the impairments introduced by impairment processor 750. A symbol decision stage 754 then makes symbol decisions based on the output of equalizer 752. Together equalizer 752 and symbol decision stage 754 constitute an auxiliary demodulator. The effects of the impairments introduced by impairment processor 750 are analyzed based on error and symbol estimate outputs of symbol decision stage 754 as described in reference to FIG. 6A.

Impairment processor 750 may apply additive interference based on error signal 217 in a manner similar to that discussed in reference to FIG. 7A. As the interference level is varied, the error and symbol estimate outputs of symbol decision stage 754 may be monitored for unacceptable performance deterioration.

Impairment processor 750 may also apply a digital filter that simulates an intensification of an existing distortion. Impairment processor 750 may determine the existing distortion by taking the pseudoinverse of the weights 221 applied by weight updating stage 220. If a particular distortion, e.g, a reflection is to be applied, it may be isolated by use of simple deconvolution, homomorphic signal processing, or parametric signal processing as was discussed with reference to FIG. 5A. Varying the intensity level of the simulated reflection or reflections while monitoring the outputs of symbol decision stage 754 helps determine how much more impairment can be tolerated without disrupting communications.

Analysis of Receiver Loop Parameters

Figure 8A:
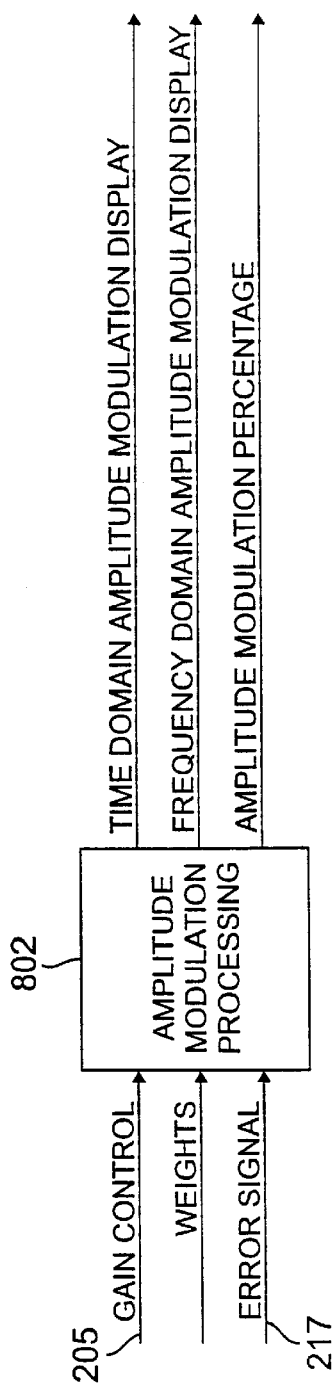
FIGS. 8A–8C are diagrams illustrating how parameters relating to residual modulation and symbol timing variation may be measured in accordance with the invention.
Figure 8B:
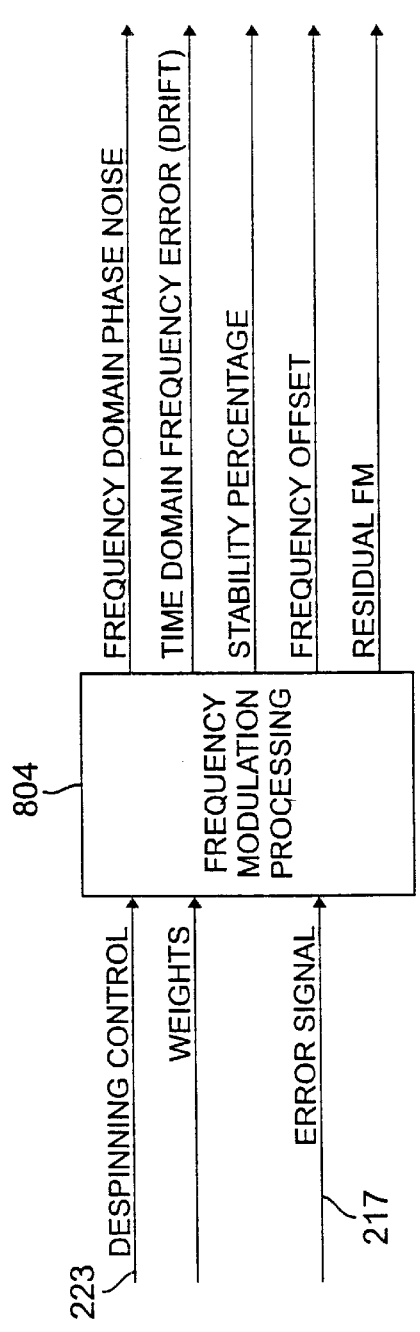
Figure 8C:
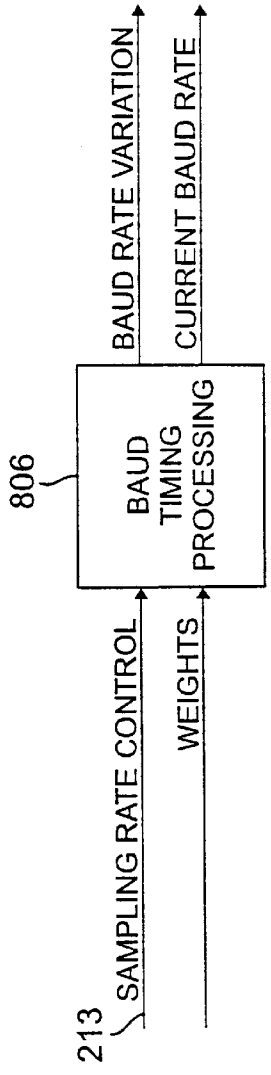

FIGS. 8A–8C are diagrams illustrating how parameters relating to residual modulation and symbol timing variation may be measured in accordance with the invention. FIG. 8A depicts how parameters relating to residual amplitude modulation may be measured and displayed in accordance with one embodiment of the present invention. Residual amplitude modulation may be caused by either transmitter or receiver components. Referring to receiver 106, residual amplitude modulation will make itself apparent in several ways. One way is variation in gain control signal 205 which will adjust so as to remove residual amplitude modulation within its loop bandwidth. The variation in the overall gain of equalizer 214 as controlled by weight update stage 220 will operate to remove amplitude variations seen within adaptive equalizer 214. Amplitude modulation that is not removed by the operation of AGC stage 204 and adaptive equalizer 214 will appear as a radial component in error signal 217 generated by symbol decision stage 216.

In order to generate information about amplitude modulation, an amplitude modulation processing stage 802 receives gain control signal 205, the weights generated by weight updated stage 220 and error signal 217 generated by symbol decision stage 216. Prior to further processing, gain control signal 205 is filtered to remove the known dynamics of the gain control loop. The received weights are processed to isolate the time varying portion of the overall gain of equalizer 214. The cutoff frequency of this isolated gain response is determined responsive to the loop bandwidth of the AGC loop formed by gain stage 202 and automatic gain control stage 204. Two-dimensional error signal 217 is processed to isolate a radial component. Amplitude modulation stage 802 then determines, in the time domain, a weighted sum of gain control signal 205, the time varying portion of the gain of equalizer 214, and radial component of error signal 217 to obtain a time domain representation of the residual amplitude modulation of the received signal input to gain stage 202. One of skill in the art will understand how to adjust the weights appropriate to the parameters of adaptive equalizer 214 and symbol decision stage 216.

Once a time domain representation of the residual amplitude modulation is generated, it may be displayed directly. Alternatively, it may be converted to the frequency domain using well known techniques prior to display as an amplitude modulation spectrum. This type of display is highly useful in isolating, e.g., hum caused by poor isolation between power line noise and transmitter or receiver components. Another useful parameter that may be displayed numerically is the percentage of amplitude modulation which is defined as the amplitude of the time domain amplitude modulation signal divided by the overall received signal amplitude, which is a fixed parameter of the receiver.

FIG. 8B depicts how parameters relating to frequency and/or phase modulation may be determined in accordance with one embodiment of the present invention. Referring again to receiver 106, residual frequency and/or phase modulation will show up in despinning control signal 223 as it seeks to correct for the angular component of error signal 217. Equalizer 214 will also seek to correct for residual frequency and/or phase modulation and variation through variation in the phase component of the weights generated by equalizer weight update stage 220. However, the remaining uncompensated angular component of error signal 217 will also represent a component of frequency and/or phase modulation.

In accordance with one embodiment of the present invention, a frequency modulation processing stage 804 receives despinning control signal 223, the weights generated by weight update stage 220, and error signal 217. Prior to further processing, despinning control signal is filtered to remove the known characteristics of the carrier recovery loop. Frequency modulation processing stage 804 isolates the time varying phase component of the weights and the angular component of error signal 217 and generates a weighted sum of these components with despinning control signal 223. The weighted sum serves as a time domain representation of instantaneous phase error.

This phase error signal can be displayed directly in the time domain, enabling the operator to recognize periodicity or other patterns. The preferred embodiment also has the capability of converting the phase error signal to the frequency domain. The carrier signal, whose amplitude and frequency are fixed receiver parameters, can be superimposed over a frequency domain display of the phase error to provide convenient read out of phase noise level in dBc/Hz (decibels below carrier per Hertz). The phase error signal can also be differentiated to provide a time domain display of frequency error relative to expected carrier frequency. Low frequency variations in frequency error represent drift of carrier frequency. A stability percentage over a given time may also be computed and displayed. An average frequency error can also be displayed numerically as a fixed offset indicating, e.g., transmitter component variation. Note that some receiver architectures do not downconvert received signals all the way to DC. In these architectures, downconverted frequency offset should be removed prior to display of frequency error. A frequency domain representation of the differentiated phase error signal will help show sources of residual FM.

FIG. 8C depicts how baud rate and baud rate variation may be analyzed and displayed in accordance with one embodiment of the present invention. Variations in baud time will appear within receiver 106 via sampling rate control signal 213 which operates to synchronize sampling and via the variation in delay through equalizer 214. A baud timing processing stage 806 receives sampling rate control signal 213 and the weights generated by equalizer weight update stage 220. Prior to further processing, baud timing processing stage 806 filters sampling rate control signal 213 to remove the known dynamics of the baud timing recovery loop. Baud timing processing stage 806 isolates the time varying delay component of the response of equalizer 214 as represented by the weights and obtains a weighted sum of sampling rate control signal 213 and the time domain representation of the isolated delay component to form a timing signal. The so-obtained timing display may be displayed numerically as the current baud rate or graphically to show variation in baud rate over time. Baud rate variations would be caused by errors or problems in the transmitter. A baud rate stability percentage over a given time may also be displayed.

Of course, in receiver architectures that do not include an adaptive equalizer, estimates of the above-described modulation and timing parameters could be obtained from the various control loop parameters alone. Equalizer weights and error signals would not be considered.

In a preferred embodiment, the invention is sufficiently modular and programmable to allow customization of the demodulator, system parameters, modulation types, displays and diagnostics to meet specific system requirements.

In another preferred embodiment, the invention is powered by a battery, increasing the portability of the system.

Variations on the methods and apparatus disclosed above will be readily apparent to those of ordinary skill in the art. Accordingly, particulars disclosed above are intended not as limitations of the invention.

Bibliography

[Haykin83] S. S. Haykin, *Non-Linear Methods of Spectral Analysis*, (Springer-Verlag 1983).

[Haykin85] S. S. Haykin, *Array Signal Processing*, (Prentice-Hall 1985).

[Haykin91] S. S. Haykin, *Advances in Spectrum Analysis and Array Processing*, (Prentice-Hall 1991).

[IEEE79] *Programs for Digital Signal Processing*, Edited by the Digital Signal Processing Committee, IEEE Acoustics, Speech, and Signal Processing Society, (IEEE Press 1979).

[Marple87] S. L. Marple, *Digital Spectral Analysis*, (Prentice-Hall 1987).

[Oppenheim89] A. V. Oppenheim & R. W. Schafer, *Discrete-Time Signal Processing*, (Prentice-Hall 1989).

[VanTrees68] E. L. Van Trees, *Detection, Estimation, and Linear Modulation Theory*, (John Wiley & Sons 1978).

We claim:

1. In a digital communication system wherein a modulated signal is transmitted over a channel to a receiver, the modulated signal comprising a data signal modulated onto a carrier signal, a method of diagnosing said channel comprising the steps of:

a) receiving said modulated signal as corrupted by said channel;

b) generating an error signal estimate representative of an error between said modulated signal as transmitted and said received modulated signal;

c) generating a power estimate representative of a power of said received modulated signal;

d) converting said error signal estimate to a frequency domain representation; and e) displaying said frequency domain representation relative to said power estimate.

2. The method of claim 1 wherein said receiver comprises an equalizer and further comprising the step of:

adjusting said frequency domain representation for a response of said equalizer.

3. The method of claim 1 wherein step b) further comprises employing symbol decision to identify an estimate of the transmitted data signal from a demodulated version of the received modulated signal;

generating the error signal estimate using the estimate of the transmitted data signal and the demodulated version of the received modulated signal.

4. The method of claim 3 wherein step b) further comprises, prior to performing symbol decision, performing adaptive equalization on the demodulated version of the received modulated signal.

5. An apparatus for diagnosing a channel in a digital communication system, wherein a modulated signal is transmitted over the channel to a receiver, the modulated signal comprising a data signal modulated onto a carrier signal, the apparatus comprising:

a) a receiver operable to receive said modulated signal as corrupted by said channel, generate an error signal estimate representative of an error between said modulated signal as transmitted and said received modulated signal, and generate a power estimate representative of a power of said received modulated signal;

b) a diagnostic processor operably connected to receive said error signal estimate from the receiver, the diagnostic processor operable to convert said error signal estimate to a frequency domain representation and determine said frequency domain estimate relative to said power estimate.

6. The apparatus of claim 5 further comprising a display operably connected to the diagnostic processor to receive the frequency domain representation relative to said power estimate and generate a visible display thereof.

7. The apparatus of claim 5 wherein a processor performs at least some of the operations of the receiver and at least some of the operations of the diagnostic processor.

8. The apparatus of claim 5 wherein the receiver includes a processor, said processor operable to:

perform symbol decision on a demodulated version of the received modulated signal to generate an estimate of the data signal as transmitted; and estimate the error signal using the estimate of the data signal as transmitted and the demodulated version of the received modulated signal.

9. The apparatus of claim 8 wherein the processor is further operable to perform adaptive equalization on the demodulated version of the received modulated signal prior to performing symbol decision on the received modulated signal to generate the estimate of the data signal as transmitted.

10. The apparatus of claim 9 wherein the diagnostic processor is further operable to adjust said frequency domain representation for a response of said adaptive equalization.

11. The apparatus of claim 5 wherein the receiver further includes an analog tuning/down conversion circuit and a sampling circuit.

12. The apparatus of claim 5 wherein the receiver further includes a digital down conversion circuit.

13. A computer program product that controls a processor of a receiver, the processor operable to diagnose a channel in a digital communication system wherein a modulated signal is transmitted over the channel to the receiver, the modulated signal comprising a data signal modulated onto a carrier signal, the receiver operable to receive the modulated signal as corrupted by said channel, the computer program product comprising:

a) code to generate an error signal estimate representative of an error between said modulated signal as transmitted and said received modulated signal;

b) code to generate a power estimate representative of a power of said received modulated signal;

c) code to convert said error signal estimate to a frequency domain representation; and d) code to determine said frequency domain representation relative to said power estimate.

14. The computer program product of claim 13 further comprising code to cause a display to display said frequency domain representation relative to said power estimate.

15. The computer program product of claim 13 wherein said receiver includes an equalizer and the computer program product further comprises code to adjust said frequency domain representation for a response of said equalizer.

16. The computer program product of claim 13 comprising:

code to perform symbol decision to identify an estimate of the transmitted data signal from a demodulated version of the received modulated signal; and code to generate the error signal estimate using the estimate of the transmitted data signal and the demodulated version of the received modulated signal.

17. The computer program product of claim 16 further comprising code to, prior to performing symbol decision, perform adaptive equalization on the demodulated version of the received modulated signal.

18. An apparatus for monitoring ingress on a channel in a digital cable communication system, wherein a modulated signal is transmitted over the channel to a receiver, the modulated signal comprising a data signal modulated onto a carrier signal, the apparatus comprising:

a) the receiver operable to receive said modulated signal as corrupted by ingress on said channel, generate an error signal estimate representative of an error between said modulated signal as transmitted and said received modulated signal;

b) a diagnostic processor operably connected to receive said error signal estimate from the receiver, the diagnostic processor operable to convert said error signal estimate to a frequency domain representation, the frequency domain representation representative of ingress on said channel.

19. The apparatus of claim 18 further comprising a display operably connected to the diagnostic processor to receive the frequency domain representation from the diagnostic processor and generate a visible display thereof.

20. The apparatus of claim 18 wherein the receiver is further operable to generate a power estimate representative of a power of said received modulated signal, and wherein the diagnostic processor is further operable to determine said frequency domain estimate relative to said power estimate.

21. The apparatus of claim 20 further comprising a display operably connected to the diagnostic processor to receive the frequency domain representation relative to said power estimate and generate a visible display thereof.

* * * * *